US009859068B2

(12) United States Patent
Oneufer et al.

(10) Patent No.: US 9,859,068 B2
(45) Date of Patent: Jan. 2, 2018

(54) BUCKET ASSEMBLIES FOR MOTOR CONTROL CENTERS (MCC) WITH DISCONNECT ASSEMBLIES AND RELATED MCC CABINETS AND METHODS

(71) Applicant: Eaton Corporation, Cleveland, OH (US)

(72) Inventors: Stephen W. Oneufer, Fayetteville, NC (US); Robert A. Morris, Fayetteville, NC (US); Daniel B. Kroushl, Clayton, NC (US)

(73) Assignee: Eaton Corporation, Cleveland, OH (US)

( * ) Notice: Subject to any disclaimer, the term of this patent is extended or adjusted under 35 U.S.C. 154(b) by 200 days.

(21) Appl. No.: 14/501,969

(22) Filed: Sep. 30, 2014

(65) Prior Publication Data
US 2015/0103472 A1    Apr. 16, 2015

Related U.S. Application Data

(60) Provisional application No. 61/890,495, filed on Oct. 14, 2013.

(51) Int. Cl.
*H02B 1/36* (2006.01)
*H01H 3/04* (2006.01)
(Continued)

(52) U.S. Cl.
CPC .............. *H01H 3/04* (2013.01); *H01H 3/38* (2013.01); *H01H 9/22* (2013.01); *H01H 71/56* (2013.01);
(Continued)

(58) Field of Classification Search
CPC ...... H01H 3/04; H01H 3/38; H01H 2071/565; H01H 9/22; H01H 21/02; H01H 71/521;
(Continued)

(56) References Cited

U.S. PATENT DOCUMENTS 3,626,253 A * 12/1971 Sturdivan ................ H02B 1/36
361/608
4,024,441 A    5/1977 Coyle et al.
(Continued)

FOREIGN PATENT DOCUMENTS

| KR | 101143817 B1 | * | 5/2012 | ............ H02B 1/015 |
| KR | 20130026748 A | * | 3/2013 | ............ H02B 1/26 |
| KR | 101443314 B1 | * | 9/2014 | ............ H02B 1/36 |

OTHER PUBLICATIONS

International Search Report and Written Opinion for corresponding PCT Application No. PCT/US2014/059642, 21 pages, dated Apr. 1, 2015.
(Continued)

*Primary Examiner* — Courtney Smith
(74) *Attorney, Agent, or Firm* — Myers Bigel, P.A.

(57) ABSTRACT

Circuit breakers with a rotary handle attached to an inwardly oriented shaft that connects to a gear assembly that translates rotational input to linear input also include a trip assist spring in communication with the rack gear so that, in operation, the trip assist spring applies a force to the operator slider and forces the handle to a consistent trip position.

24 Claims, 22 Drawing Sheets

(51) Int. Cl.
*H01H 3/38* (2006.01)
*H01H 9/22* (2006.01)
*H01H 71/56* (2006.01)
*H02B 1/00* (2006.01)

(52) U.S. Cl.
CPC ......... *H02B 1/00* (2013.01); *H01H 2071/565* (2013.01); *H01H 2221/024* (2013.01); *H01H 2221/08* (2013.01); *H01H 2235/01* (2013.01); *H01H 2239/02* (2013.01); *H02B 1/36* (2013.01)

(58) Field of Classification Search
CPC ... H02B 1/14; H02B 1/26; H02B 1/36; H02B 5/00; H02B 13/02; H02B 1/04
USPC ....... 361/603, 605, 608, 609, 611, 614, 615, 361/622, 632, 636, 640; 200/50.17, 200/50.21, 329, 330, 337, 293, 500, 501, 200/318–327, 308; 439/114, 145, 310, 439/372; 29/592.1, 825; 174/50.52, 174/117 F
See application file for complete search history.

(56) References Cited

U.S. PATENT DOCUMENTS

| | | | | |
|---|---|---|---|---|
| 4,305,114 A * | 12/1981 | Takagi | ............... | H02B 3/00 361/609 |
| 4,317,160 A * | 2/1982 | Tillson | ............... | H02B 11/133 200/50.25 |
| 4,502,097 A * | 2/1985 | Takahashi | ............... | H02B 1/36 361/614 |
| 4,503,408 A | 3/1985 | Mrenna et al. | | |
| 4,860,161 A * | 8/1989 | Maki | ............... | H02B 11/133 200/50.17 |
| 4,926,286 A * | 5/1990 | Maki | ............... | H02B 11/133 200/50.17 |
| 5,219,070 A * | 6/1993 | Grunert | ............... | H01H 9/281 200/330 |
| 5,241,290 A * | 8/1993 | Sehmer | ............... | H01H 71/56 335/132 |
| 5,539,614 A * | 7/1996 | Ishikawa | ............... | H02B 1/36 361/603 |
| 5,910,760 A | 6/1999 | Malingowski et al. | | |
| 6,124,558 A | 9/2000 | Baumeister et al. | | |
| 6,194,983 B1 * | 2/2001 | Bogdon | ............... | G05G 1/04 200/329 |
| 6,797,903 B1 * | 9/2004 | Winslett | ............... | H01H 71/501 200/330 |
| 7,186,933 B2 * | 3/2007 | Turner | ............... | G05G 1/04 200/50.21 |
| 7,893,370 B2 * | 2/2011 | Schmitt | ............... | H02B 1/36 200/400 |
| 8,305,736 B2 * | 11/2012 | Yee | ............... | H02B 1/36 200/50.22 |
| 8,378,245 B2 | 2/2013 | Fischer | | |
| 8,638,561 B2 * | 1/2014 | Lehtola | ............... | H05K 7/1409 361/724 |
| 9,337,629 B2 * | 5/2016 | Oneufer | ............... | H02B 1/48 |
| 9,484,163 B2 * | 11/2016 | Oneufer | ............... | H01H 9/223 |
| 9,531,169 B2 * | 12/2016 | Oneufer | ............... | H02B 1/46 |
| 2003/0019984 A1 * | 1/2003 | Yee | ............... | H02B 1/38 248/220.31 |
| 2009/0301851 A1 * | 12/2009 | Morris | ............... | H01H 3/26 200/331 |
| 2011/0110049 A1 * | 5/2011 | Lehtola | ............... | H05K 7/1409 361/724 |
| 2012/0127635 A1 | 5/2012 | Grindeland | | |
| 2013/0077210 A1 * | 3/2013 | Morris | ............... | H02B 1/36 361/631 |
| 2013/0334023 A1 * | 12/2013 | Miller | ............... | H01H 31/003 200/52 R |
| 2016/0322791 A1 * | 11/2016 | Oneufer | ............... | H02B 1/48 |
| 2016/0360626 A1 * | 12/2016 | Oneufer | ............... | H02B 1/36 |

OTHER PUBLICATIONS

Invitation to Pay Additional Fees for corresponding PCT Application No. PCT/US2014/059642, 5 pages, dated Jan. 8, 2015.
Compact MCC offering, Eaton, product description, 2012, 2 pages.
Cutler-Hammer, Low Voltage Motor Control Centers (as/dc), Eaton, Technical Data, 2002, 52 pages.
Cutler-Hammer, Magnum IEC Low Voltage Air Circuit Breakers, Eaton, Product Focus, 2003, 96 pages.
Packaged Control: MCCs & Enclosed Control, 101 Basic Series, Learning Module 22, Eaton, training manual, date unknown but believed to be before the priority date of the present application, 27 pages.

* cited by examiner

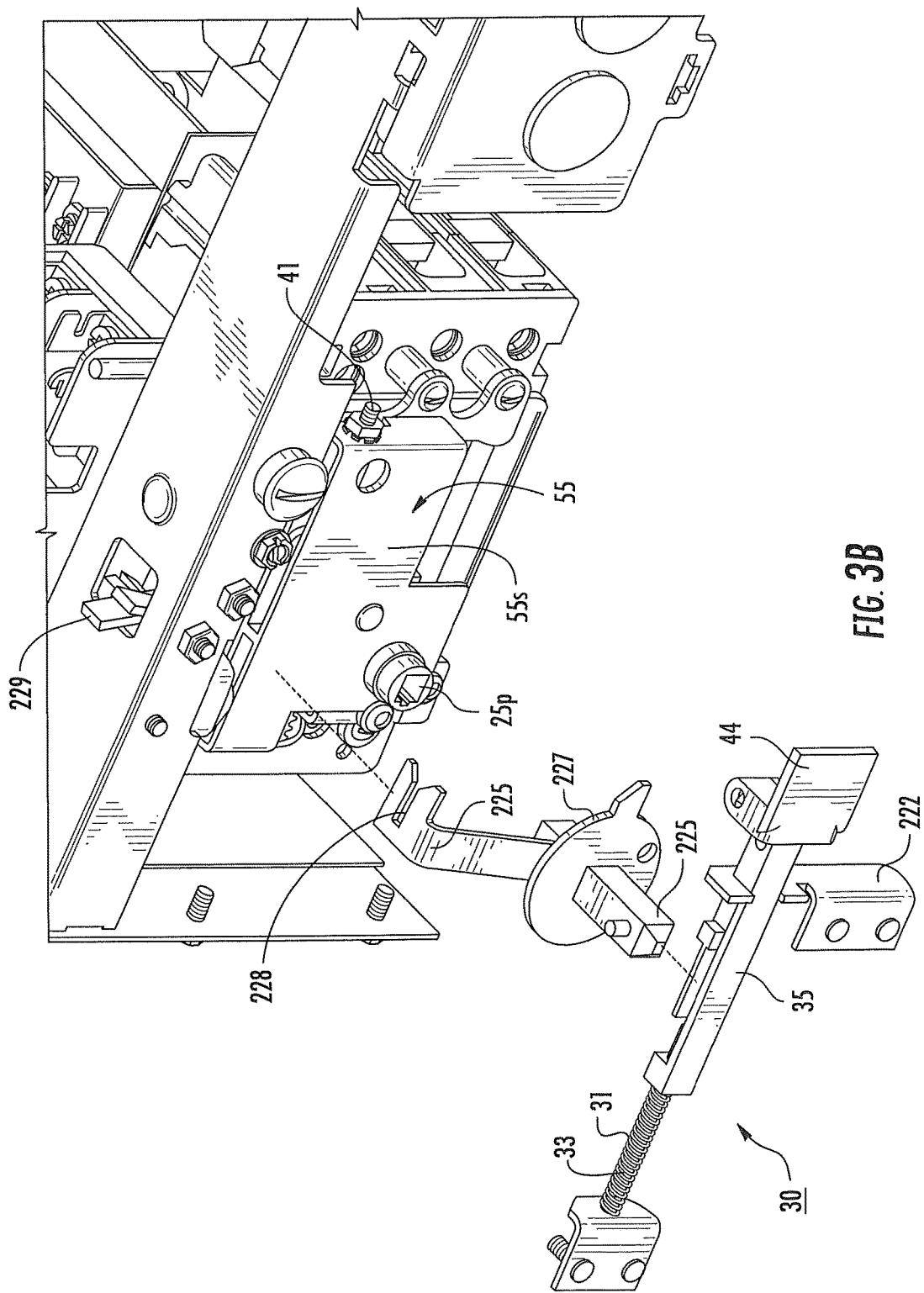

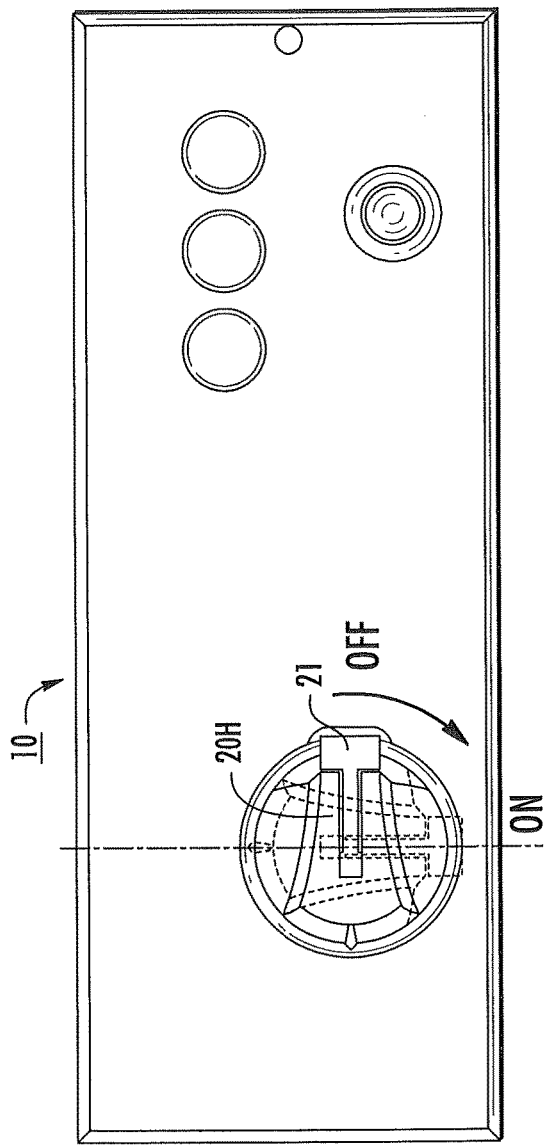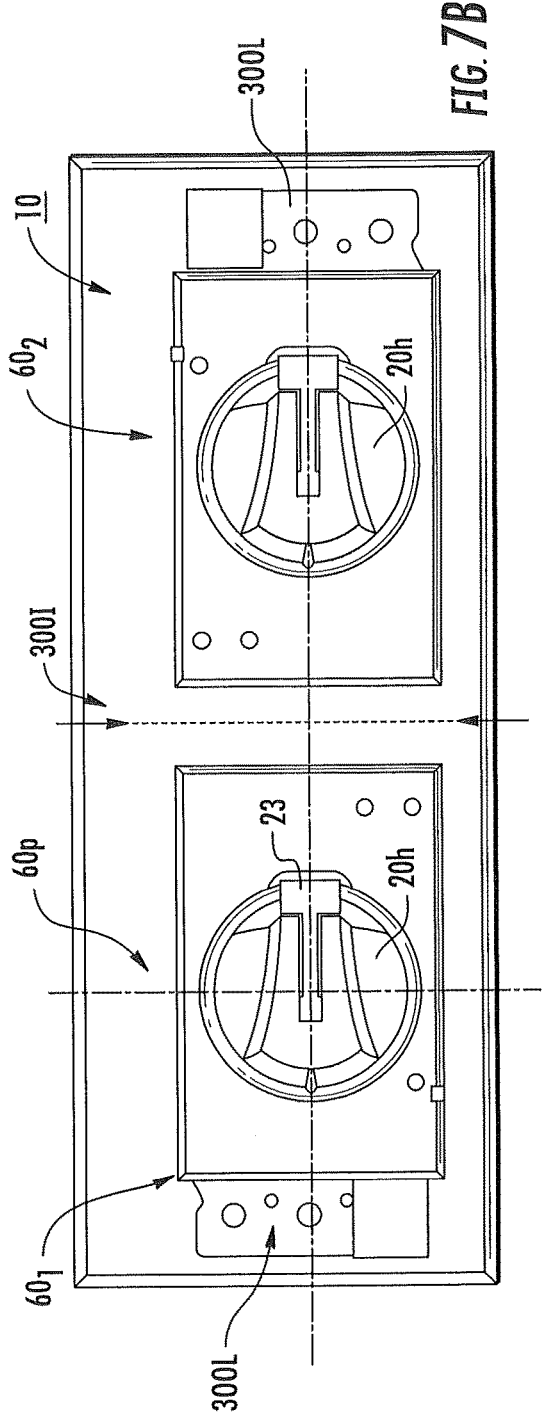

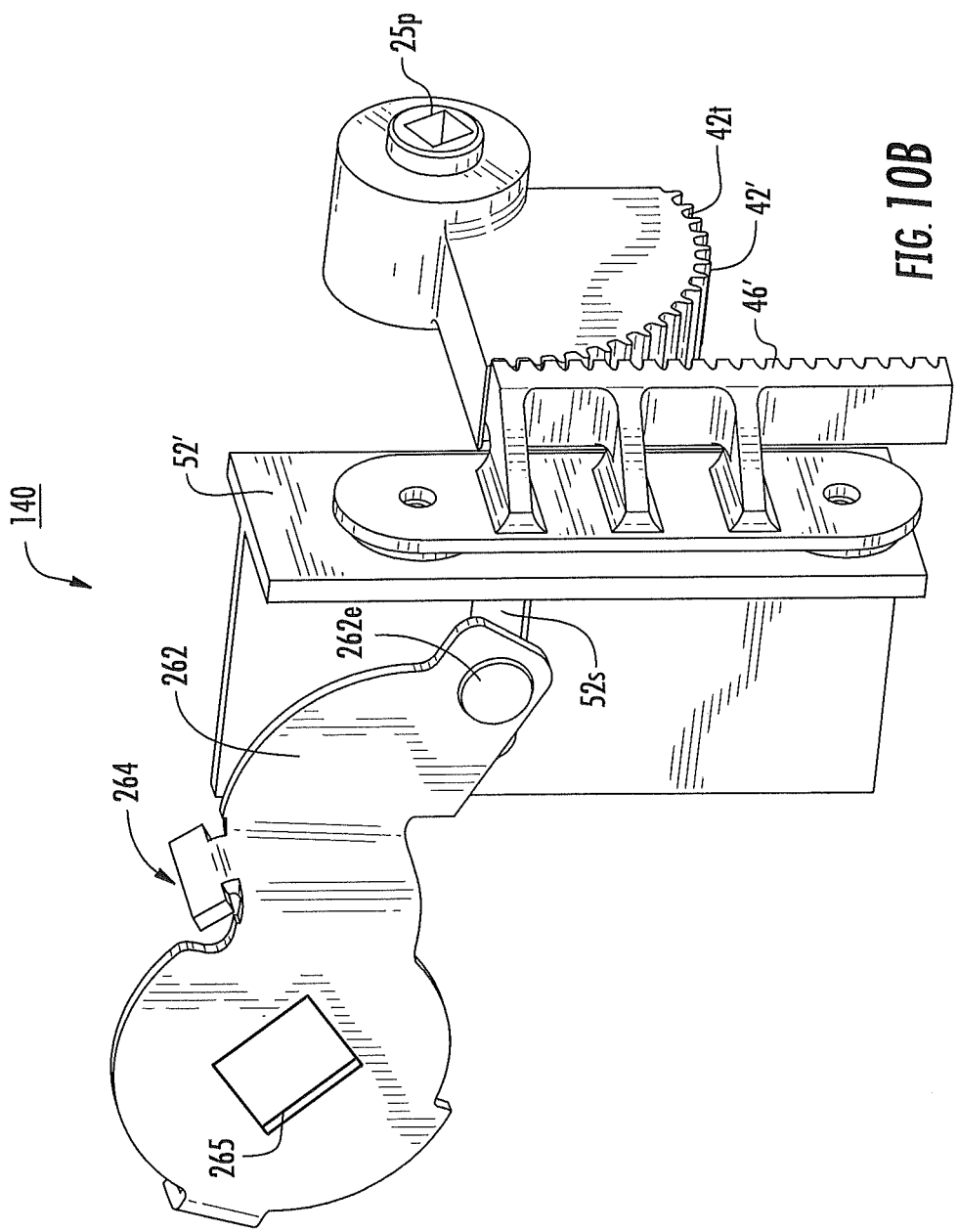

BUCKET ASSEMBLIES FOR MOTOR CONTROL CENTERS (MCC) WITH DISCONNECT ASSEMBLIES AND RELATED MCC CABINETS AND METHODS

RELATED APPLICATIONS

This application claims the benefit of and priority to U.S. Provisional Application Ser. No. 61/890,495, filed Oct. 14, 2013, the content of which is hereby incorporated by reference as if recited in full herein.

FIELD OF THE INVENTION

The present invention relates to motor control center units.

BACKGROUND OF THE INVENTION

As is known to those of skill in the art, Motor Control Centers (MCC) can include cabinets or enclosures that hold multiple, typically modular, bucket assemblies or units of various sizes. See, e.g., U.S. Pat. No. 4,024,441, the contents of which are hereby incorporated by reference as if recited in full herein. Eaton Corporation has recently introduced a MCC product line with compact bucket assemblies that conveniently plug into a slot or space in an MCC cabinet. The product is sold under the product name, Freedom 2100 MCC. See also, U.S. Patent Application Publication Serial Number US2013/0077210, the contents of which are hereby incorporated by reference as if recited in full herein.

The bucket assemblies can include rotary handles that are disposed on the front door. The rotary handle can be configured to convert the rotary motion of the rotary handle to the linear or translational motion of a circuit breaker linear action lever. See, e.g., U.S. Pat. Nos. 6,194,983 and 7,186,933, the contents of which are incorporated by reference as if recited in full herein. The rotary handle is typically mounted parallel with the plane of the faceplate of the molded case circuit breaker, but spaced outwardly from it by the depth of the handle mechanism. Usually a series of linkages are utilized to interconnect the rotary motion of the rotary handle to the linear motion of the circuit breaker handle or lever.

Despite the above, there remains a need for alternate bucket assembly configurations.

SUMMARY OF EMBODIMENTS OF THE INVENTION

Embodiments of the invention provide bucket assemblies with an external handle that has a consistent tip position which can provide a visual indication of the status of the circuit breaker so that an observer can tell whether the circuit breaker is conducting electrical current or blocking electrical current.

Embodiments of the invention provide a unit with a rotary position of a rotary handle positioned on a centerline of the breaker, in-line with a corresponding center pole.

Embodiments of the invention symmetrically position a disconnect operator handle on an MCC cabinet allowing a panel board, mounted tandem (line to line), dual feeder breakers in a compact unit with both handles positioned correctly aligned.

Embodiments of the invention provide a handle detent to assist in positioning the handle to the defined tripped configuration, typically with the handle in a vertical orientation.

Embodiments of the invention spring-bias the operating mechanism to a consistent trip position, independent of a breaker toggle trip position.

Embodiments of the invention provide a handle escutcheon with a spring-loaded door assembly that locks the door shut when the circuit is energized. The door and latch and door catch configuration can be configured so as to avoid requiring manual adjustment for proper assembled alignment.

Embodiments of the invention integrate a gear and rack, dynamic operating mechanism and a sliding carriage configuration to articulate breaker lever and/or fuse switch displacement Embodiments of the invention are directed to bucket assemblies. The bucket assemblies include an external rotary handle having a defined ON position and OFF position associated with conduction and non-conduction; a shaft attached to the rotary handle and extending into the bucket assembly; an operator mechanism cooperably engaging the shaft, the operator mechanism comprising a gear assembly with a rack gear that linearly moves an operator slider; a circuit breaker in the bucket assembly having a lever in communication with the operator slider; and a trip assist spring that cooperates with the rack gear to move the external rotary handle to a defined consistent orientation when the circuit breaker trips.

The bucket assembly of claim 1, wherein the rotary handle ON and OFF positions are about 90 degrees apart.

The bucket assembly of claim 1, wherein the trip assist spring applies a force to bias the operator slider to reside at a location that is at a medial position of its sliding travel path.

The bucket assembly of claim 1, wherein the rotary handle has an externally visible protruding shaped feature or member.

Other embodiments are directed to a bucket assembly that includes a rotary handle attached to an inwardly oriented shaft; a drive gear in communication with the shaft so that rotation of the rotary handle rotates the drive gear; a pinion gear in communication with the drive gear; a rack gear in communication with the pinion gear; an operator slider in communication with the rack gear; a stationary operator base in communication with the operator slider and attached to a circuit breaker; a breaker lever in communication with the operator slider; and a trip assist spring in communication with the rack gear and slider. The trip assist spring applies a force to bias the operator slider to reside at a location that is at a medial position of its sliding travel path to thereby provide a trip assist force to move the rotating handle to a consistent OFF position when the circuit breaker trips.

The circuit breaker can have a housing with a door. The rotary handle can reside outside the door. The door can include an automated electronically operated internal interlock assembly inside the operator mechanism envelope that may have a laterally extending spring residing over a door interlock bolt. The bolt slidably can extend to lock a door bracket.

The rack gear can include rack gear teeth and the trip assist spring can be held over an outer surface of a guide rod held above the rack gear teeth.

The rack gear can have horizontally oriented rack gear teeth and the rack gear can have an upper segment that resides a distance above the rack gear teeth. The trip assist spring can be held in a horizontal orientation over a guide rod held by the upper segment of the rack gear.

The trip assist spring can have an uncompressed length that is between about 50-100% of a length of the slider's sliding travel path.

The trip assist spring can have continuously compressed configurations when in operative position in the bucket/breaker.

The trip assist spring can have a length that is 30-80% less than a length of a guide rod extending therethrough.

The trip assist spring can be held by an outwardly extending arm of the rack gear in a horizontal orientation over a guide rod above rack gear teeth of the rack gear. At least one end portion of the guide rod can be held in a fixed position.

The assembly can include a stationary mounting member that has a primary planar surface and an end portion that extends inwardly therefrom, residing in front of the operator base, closer to the rotary handle than the operator base; and a guide rod that holds the trip assist spring. The guide rod can have an end portion attached to the end portion of the mounting member.

The rotary handle can be positioned on a centerline of the circuit breaker, substantially in-line with a corresponding center pole, to allow a load side of the breaker to reside facing an outer side wall of the housing.

The assembly can be provided in combination with a plurality of bucket assemblies held in a Motor Control Center cabinet.

The rotary handles of different bucket assemblies can be vertically aligned irrespective of a size of a frame of the circuit breaker and have a substantially common ON/OFF position of the rotary handle.

The assembly can include a handle having an inwardly extending plunger rotably residing in a base having a detent to assist in positioning the rotary handle to a defined OFF position in a tripped configuration.

The door interlock assembly can reside within about 0.5 inches to about 1 inch envelope between a door under a front cover of and the operator base in a depth direction along with the drive gear, pinion gear, rack gear, and trip assist spring therebetween.

The operator base can have a horizontally extending slot. The operator slider can have a rectangular slot that is smaller than the base operator slot. The breaker lever can extend through both the operator slider and operator base slots. The rack gear can be attached to an upper portion of the operator slider. The trip assist spring can be in communication with an upper portion of the rack gear.

Embodiments of the invention are directed to bucket assemblies that include a rotary handle attached to an inwardly oriented shaft; a gear assembly attached to the shaft configured to translate rotational input to linear input; an operator slider in communication with the gear assembly; a breaker lever in communication with the operator slider; and a trip assist spring held by a laterally extending guide rod in communication with the gear assembly. During a trip event, the trip assist spring forces the rotary handle to a consistent trip position.

Other embodiments are directed to motor control center (MCC) cabinets with bucket units having external (e.g., external of the breaker or unit to be accessible by a user as needed) rotary handles. The one or more bucket units can be configured so that the rotary handle communicates with a fused disconnected (e.g., a fuse and switch) and one or more bucket units are configured so that the rotary handles communicate with an operator mechanism for a circuit breaker disconnect, and wherein all the rotary handles have the same configuration and the same ON/OFF positions.

The fused disconnect and the operator mechanism each comprise a drive gear, a rack gear and a slider. The operator mechanism can include a laterally extending spring that bias' the slider to a medial position of a sliding travel path.

Still other embodiments are directed to a bucket assembly that includes tandem (line to line) dual breakers positioned with first and second spaced apart rotary handles positioned vertically and horizontally aligned.

The bucket assembly can have a substantially constant width irrespective of height and the height and/or frame size are provided in modular 6 inch increments of between about 6 inches to about 72 inches.

The dual circuit breakers can be oriented so that respective load sides face a respective opposing outer side of the bucket assembly and a respective incoming side are adjacent each other.

The dual breakers can both be feeder breakers.

Yet other embodiments are directed to Motor Control Center (MCC) cabinets with at least one unit having dual side-by-side external rotary handles in communication with respective circuit breakers, the respective circuit breakers oriented with a load side facing outward and the incoming side between the two handles facing inward.

Some embodiments are directed to Motor Control Center (MCC) cabinets with bucket units. The bucket units can have a common size external rotary handle that each communicates with a respective internal disconnect assembly that engages a toggle or switch of an internal circuit breaker or a fuse disconnect switch. The different units can have different frame sizes associated with different amperage ratings. The rotary handles can all rotate 90 degrees between OFF and ON positions and can have a common trip orientation.

Some embodiments are directed to bucket assemblies with an external rotary handle that communicates with a disconnect assembly having a gear system having a rack gear and disconnect slider that engages a (fused) disconnect switch.

The rotary handle can travel about 90 degrees between ON and OFF positions, and wherein the disconnect slider moves vertically up and down in response to rotation of the handle, which turns a drive gear that moves the rack gear attached to the disconnect slider.

The disconnect assembly can include a pivoting arm that has a lower end portion that extends into a slot or aperture of the slider and a switch contact member or feature that engages the (fused) disconnect switch.

Yet other embodiments are directed to modular bucket assemblies with an external rotary handle that communicates with a gear system having a rack gear and slider. The modular bucket assembly can be provided in different sizes that accommodates one or both of: (i) different frame size circuit breakers of different amperage rating or (ii) both a circuit breaker and a switch disconnect, and wherein each modular bucket assembly irrespective of frame size or circuit breaker or switch type, includes a common size and shape respective external rotary handle that has common ON and OFF orientation.

Each bucket assembly with a circuit breaker can have a mounting member with a planar primary body that holds a guide rod having a laterally extending spring residing thereon in a compressed configuration.

When mounted in a Motor Control Center cabinet, all single breaker and fused/switch units have rotary handles that are aligned along a left hand side of the MCC.

Other embodiments are directed to methods of fabricating units using modular components for a Motor Center Control (MCC) system. The methods include: (a) providing at least first and second sets of operator gears of different sizes; (b) providing at least first and second operator sliders of different sizes, different configurations or different sizes and different configurations; providing unit housings of different defined heights; (c) providing external rotary handles of a defined size; providing different frame size circuit breakers of different amperage; (d) attaching one set of the gears, one of the operator sliders and one of the circuit breakers to the unit housing; (e) attaching a door to the unit housing; attaching a front cover over the door; and (f) attaching one of the external rotary handles to a shaft extending out the door and front cover.

Yet other embodiments are directed to methods of modular build fabrication for units of a Motor Center Control (MCC) system. The methods include: (a) providing at least first and second sets of operator gears of different sizes; providing at least first and second operator sliders of different sizes, different configurations or different sizes and different configurations; providing unit housings of different defined heights; providing external rotary handles of a defined size; and providing different frame size circuit breakers of different amperage, wherein respective units of the MCC system comprise one of the unit housings, at least one of the circuit breakers and, for each circuit breaker, at least one set of the operator gears, one of the operator sliders, and one of the external handles, and wherein the rotary handles have the same configuration and size irrespective of circuit breaker frame size.

A modular bucket assembly configuration can have a bucket assembly with an operator slider, operator base and gear system with a trip assist spring. The modular bucket assembly is provided in different sizes with a plurality of different amperage ratings.

The operator base of each different size bucket assembly can have a mounting member with a planar primary surface that has a curvilinear long side that is above and adjacent a slider path of a respective operator slider, and wherein the mounting member has an end portion that holds an end portion of a guide rod that holds the trip assist spring in a laterally oriented, compressed configuration.

A modular bucket assembly can have a rotary external handle in communication with an operator comprising an operator slider, base and gear system with a trip assist spring, wherein the bucket assembly is provided in different sizes with a plurality of different amperage ratings including at least two of 250 A, 400 A and 600 A, and wherein the bucket assemblies have trip unit modules.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 3B is a partial exploded view of the door lock assembly shown in FIG. 3A according to embodiments of the present invention.

FIG. 7A is a front view of a unit illustrating exemplary ON and OFF rotary positions according to embodiments of the present invention.

FIG. 7B is a front view of a unit with a dual feeder configuration with tandem mounted rotary handles according to embodiments of the present invention.

FIG. 10B is an enlarged view of the slider and gear components shown in FIG. 10A.

DETAILED DESCRIPTION OF EMBODIMENTS OF THE INVENTION

Figure 1A:
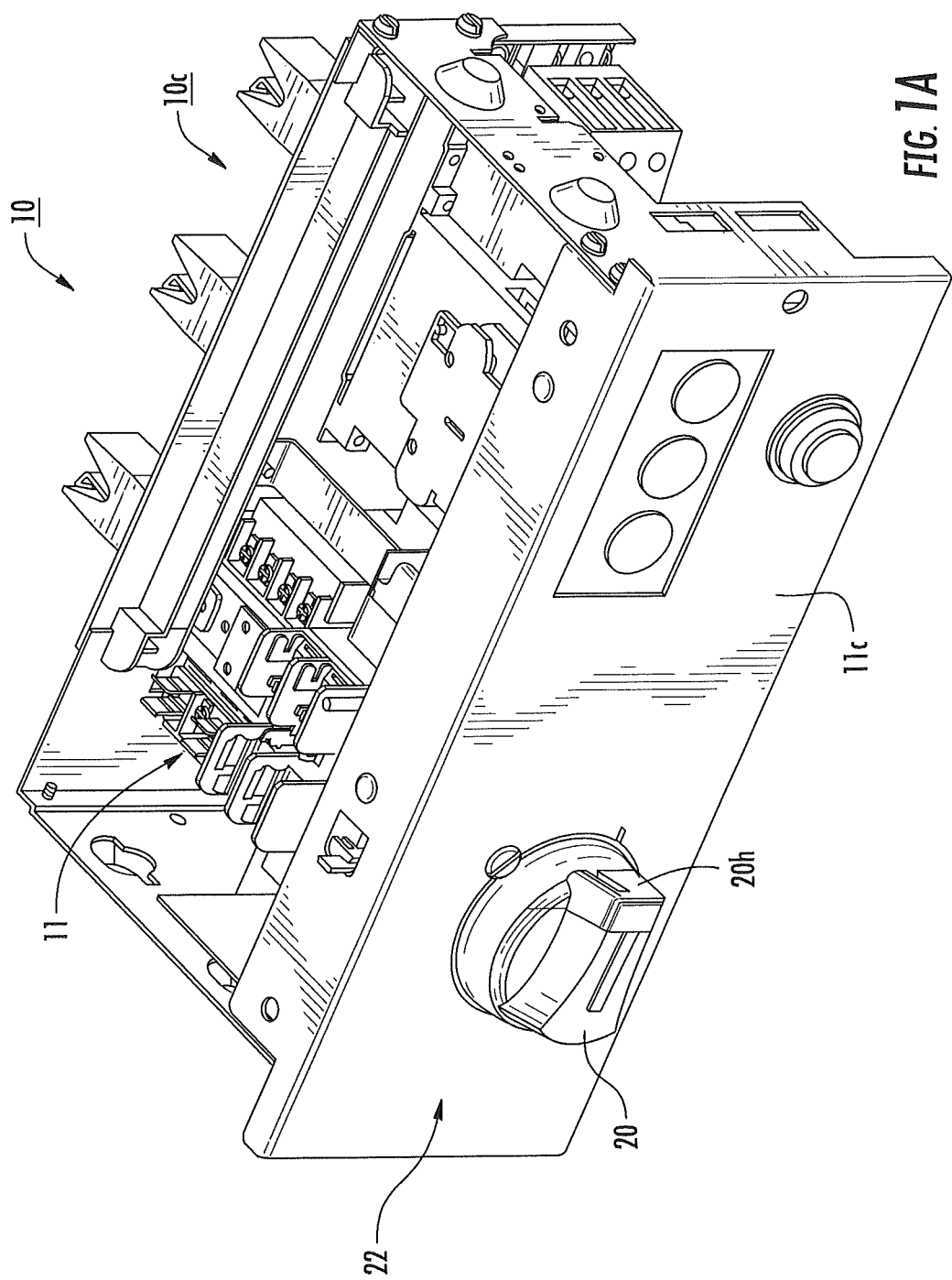
FIG. 1A is a front perspective, partial cutaway view of an exemplary bucket assembly/unit according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The term "escutcheon" refers to a cover residing about the operator handle.

The terms "operating mechanism" and "operator mechanism" are used interchangeably and refer to an assembly for opening and closing separable main contacts in a circuit breaker and/or for turning power ON and OFF using a switch associated with a fuse (e.g., a fused disconnect). The circuit breaker can be for a motor starter unit or feeder unit, for example.

The terms "bucket assembly", "bucket" and "unit" are used interchangeably and refer to a structure (typically a protective metal shell) that contains either a fuse or a circuit breaker for turning power ON and OFF to a motor, or feeder circuit, typically for controlling power to motor starters. As is well known, the bucket can be, for example, a feeder unit or a starter unit. The bucket assembly can include other components such as a power transformer, a motor starter to control a single motor and PLCs (programmable logic controllers), drives and the like. The bucket assembly can be configured as a modular device to allow the internal components to be assembled as a unit that can be easily installed into a Motor Control Center (MCC) compartment. As is well known, the bucket can have "power stabs" in the back that connect to vertical bus bars that carry power (current) to the compartments of a vertical section in an MCC cabinet. The vertical bus bars are connected to the larger horizontal bus bars that bring power to the vertical sections. The horizontal bus bars are usually in the top, but some MCC designs may have them in the center or bottom. MCCs usually have a wire way for wires to the motors and other loads and control wires.

MCCs can be configured in many ways. Each compartment can have a different height to accept different frame sizes of respective bucket assemblies or units 10, typically in about 6-inch increments. The vertical bus can be omitted or not run through the full height of the section to accommodate deeper buckets for larger items like variable frequency drives. The MCC can be a modular cabinet system for powering and controlling motors or feeder circuits. Several may be powered from main switchgear which, in turn, gets its power from a transformer attached to the incoming line from the power company.

A typical MCC cabinet is an enclosure with a number of small doors arranged in rows and columns along the front and flat, mostly featureless, back and sides. The buckets can be provided in varying sizes. For starter units, the size can be based on the size of the motor they are controlling. The bucket assembly can be configured to be relatively easily removable for repair, service or replacement. MCCs can have, for example, regular starters, reversing starters, soft start, and variable frequency drives. MCCs can be configured so that sections can be added for expansion if needed.

The term "compact" refers to bucket units 10 (also known as buckets) in a very condensed configuration (package) relative to conventional units/buckets. The MCC structure or cabinet 100 (FIG. 8) can be designed to receive multiple bucket units 10 ranging in various defined sizes. The units 10 can be provided in package or frame sizes of about 6 inches to about 72 inches (tall) with substantially common depth and width dimensions, known as 1× (6 inches) to 12× (72 inches) sizes. The sizes can be in single × increments, from 1×, 2×, 3×, 4×, 5×, 6×, 7×, 8×, 9×, 10×, 11× and 12×. Thus, a 5×MCC unit 10 can be about 30 inches tall. The frame sizes can be provided for a plurality of amperages, including a plurality of: 125 A, 150 A, 225 A, 250 A, 400 A, 600 A, 1200 A and 2000 A, for example.

Figure 1B:
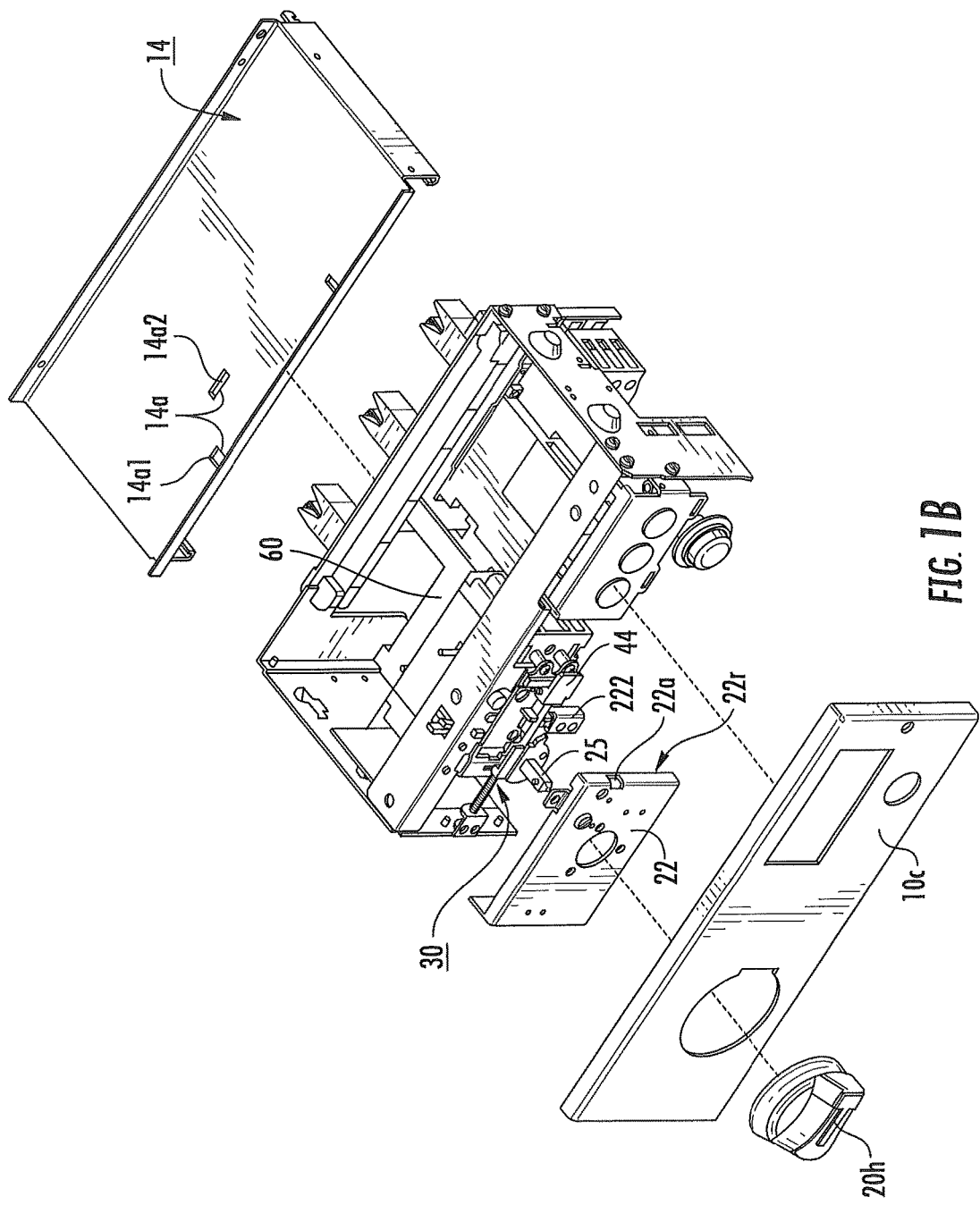
FIG. 1B is a partially exploded view of FIG. 1A according to embodiments of the present invention.

Referring now to the figures, FIGS. 1A and 1B illustrate and example of a bucket assembly or unit 10. The bucket assembly can be configured for DC (direct current) and/or AC (alternating current) operation. The bucket assembly 10 can include a front cover 10c. The bucket assembly can include at least one door 22 under the front cover. The bucket assembly 10 can have a metal frame or housing 11.

Figure 8:
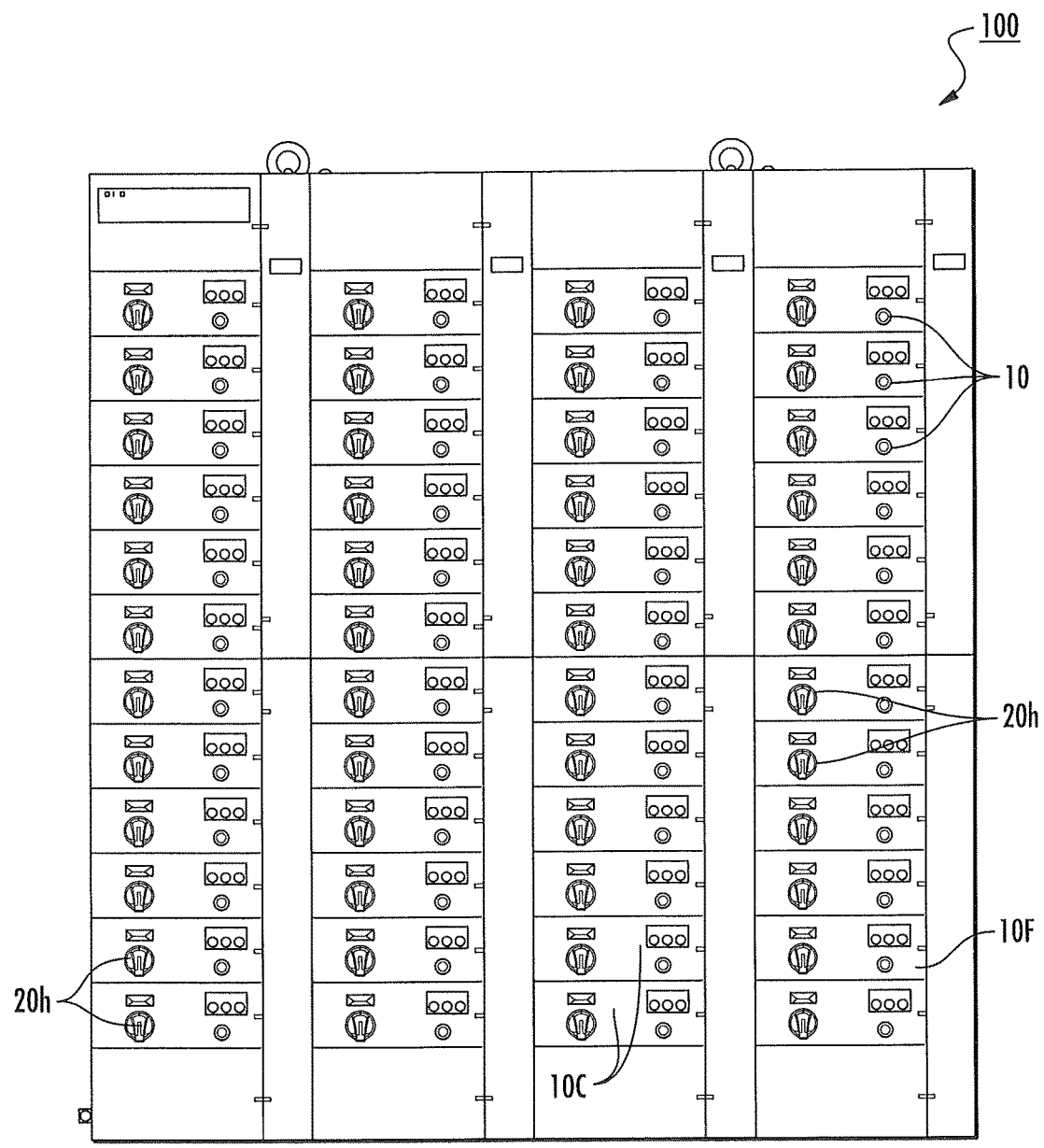
FIG. 8 is a front view of an exemplary Motor Control Center cabinet according to embodiments of the present invention.

In some embodiments, the bucket assembly 10 can comprise a molded case circuit breaker. Molded case circuit breakers are well known to those of skill in the art, as exemplified by U.S. Pat. Nos. 4,503,408 and 5,910,760, the contents of which are incorporated herein by reference as if recited in full herein. In other embodiments, the bucket assembly 10 can be configured to house a fuse disconnect with a fuse disconnect switch to turn power on and off (FIGS. 9A-9D, for example). In some embodiments, the MCC cabinet 100 can hold both type bucket units 10 (e.g., 10F and 10C) and each can have a standardized rotary handle 20h that controls the internal components for power on/off operation (FIG. 8).

The unit 10 includes a handle mechanism 20 with a rotary handle 20h. For the circuit breaker unit 10C, the unit 10 includes a shaft 25 that communicates with the handle 20h can be rotated through defined translations of rotation from circuit breaker conduction to circuit breaker non-conduction. Typically, there is about a 90° rotation from conduction to non-conduction ("OFF" to "ON") but other defined rotational stroke distances may be used including, for example, about 45 degrees, about 120 degrees, or about 180 degrees. The handle 20h can be configured to turn about 90 degrees in all different breaker sizes in a single MCC cabinet 100 (FIG. 8) that can provide standardized visual output of "on/off" and can allow for standardized components between different assemblies 10.

Figure 5:
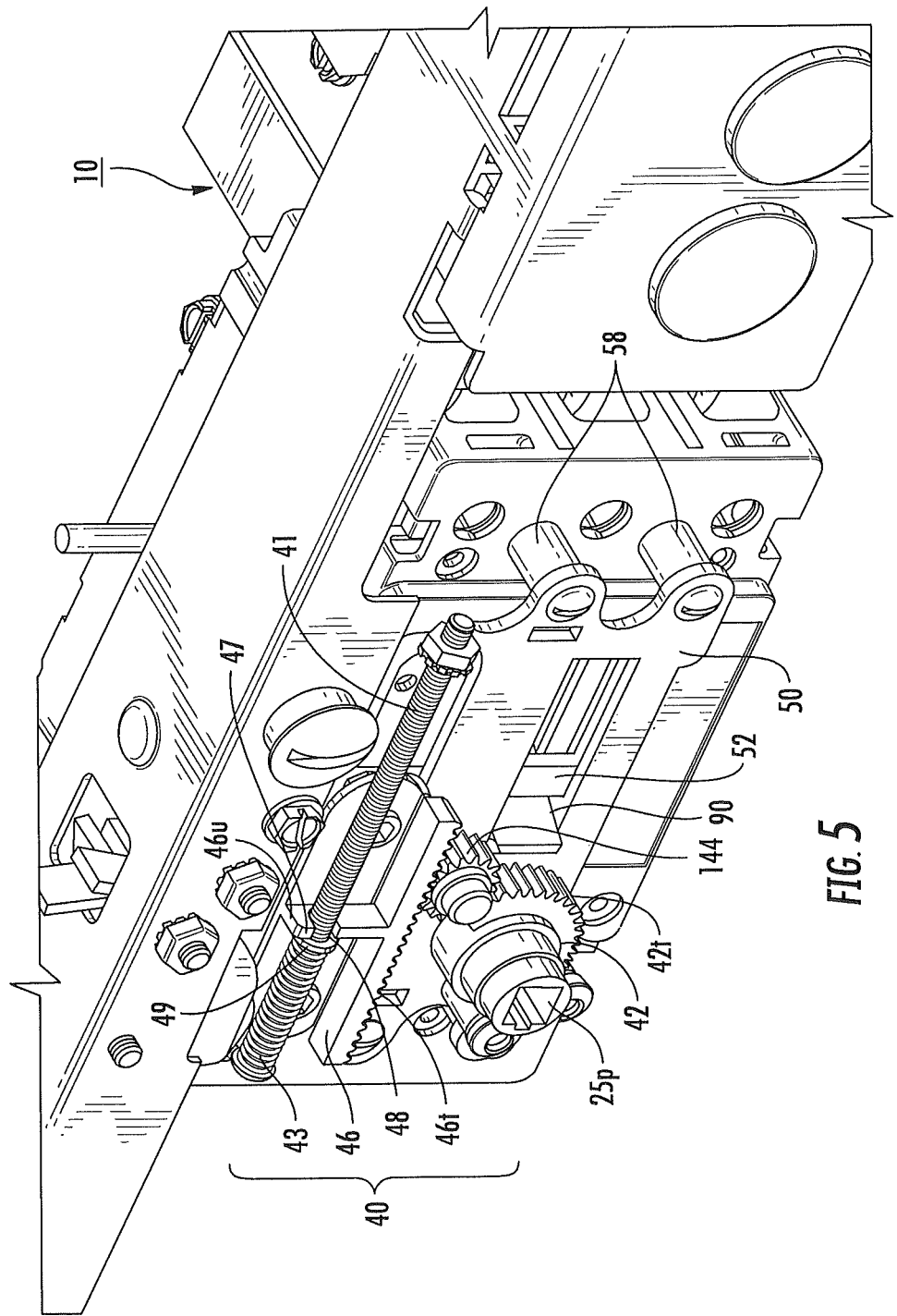
FIG. 5 is a front perspective view of the bucket assembly shown in FIG. 1A illustrating the breaker rotary to linear translating operating mechanism according to embodiments of the present invention.
Figure 9A:
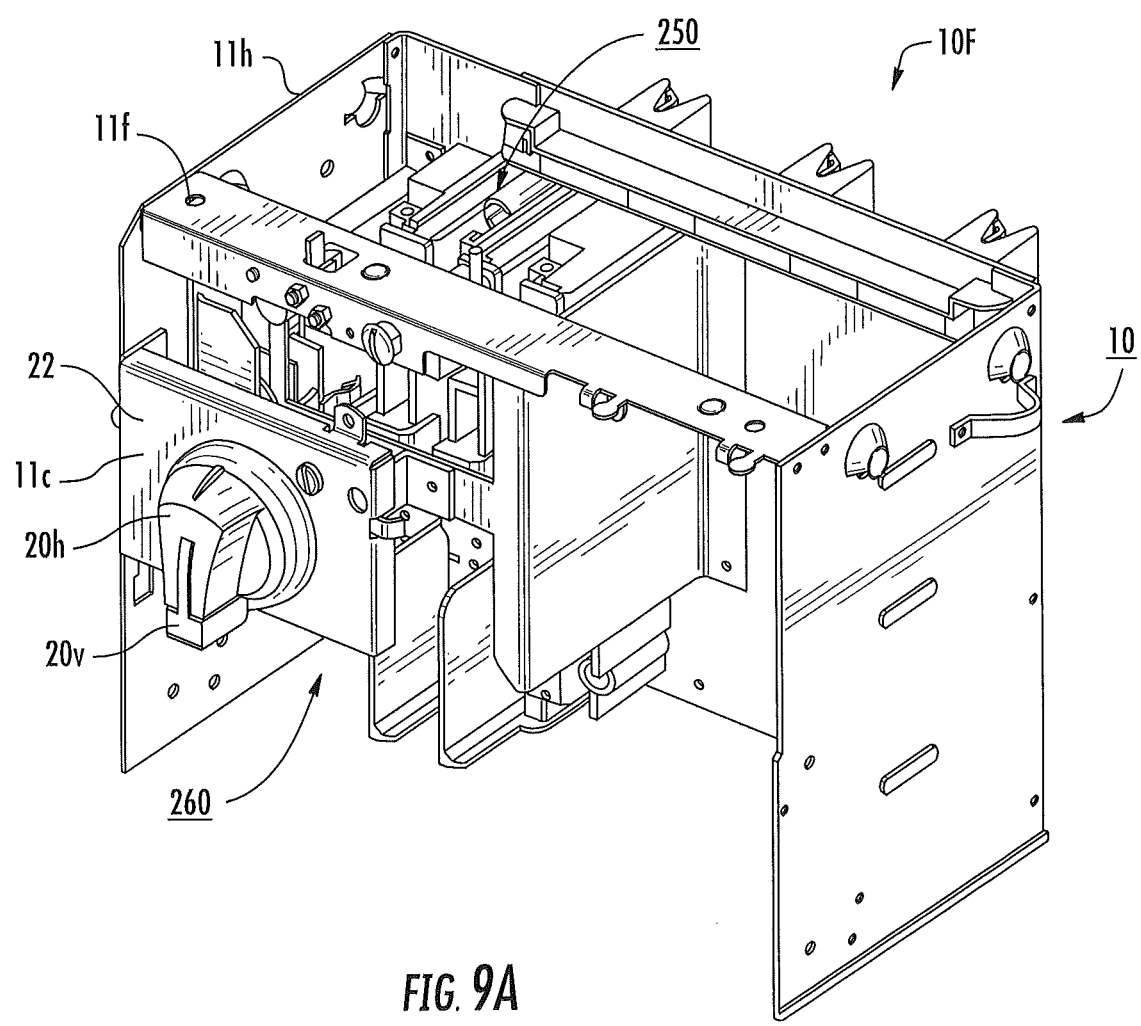
FIG. 9A is a front perspective view of a bucket assembly (with part of the housing removed) that has a fuse disconnect assembly according to embodiments of the present invention.
Figure 9B:
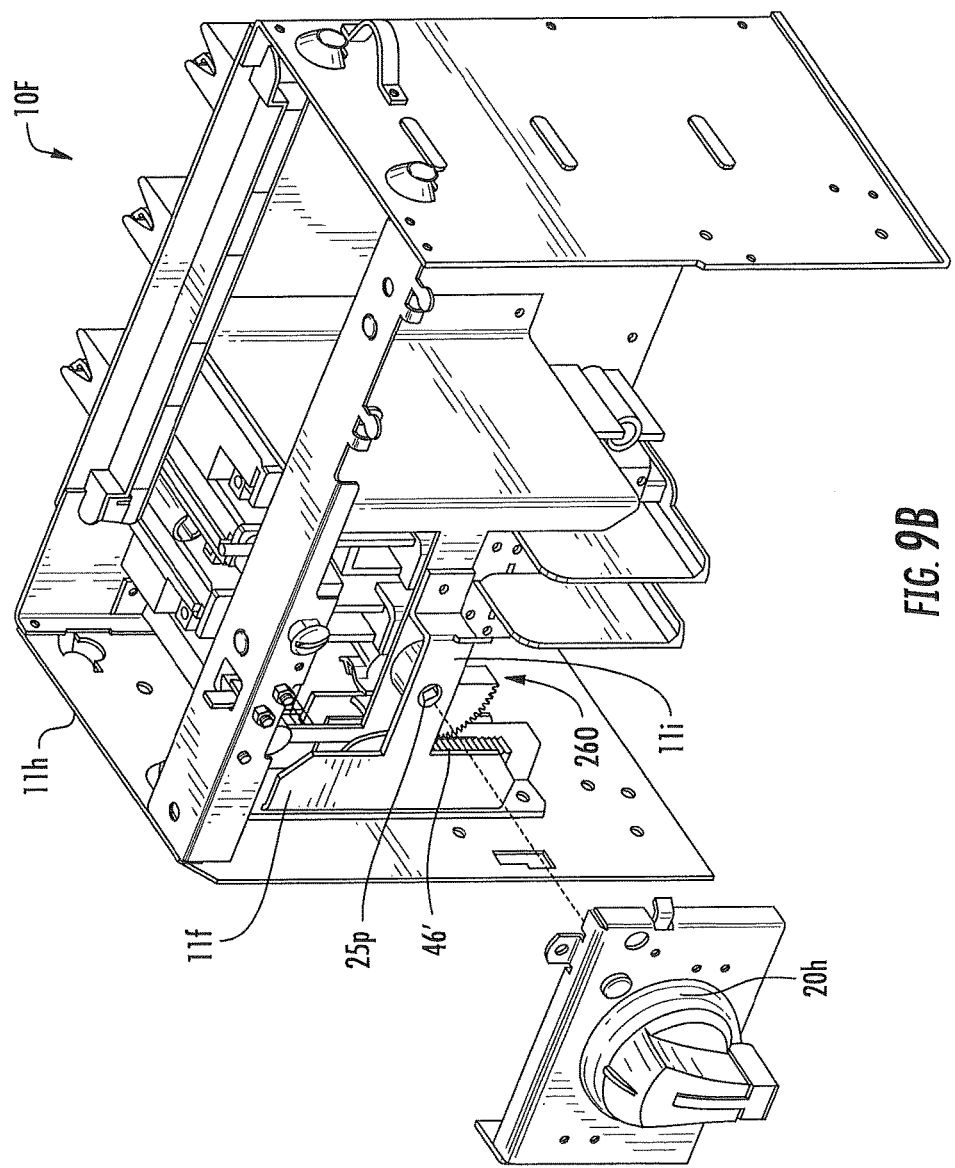
FIG. 9B is a partial exploded, front perspective view of the bucket assembly shown in FIG. 9A.
Figure 9C:
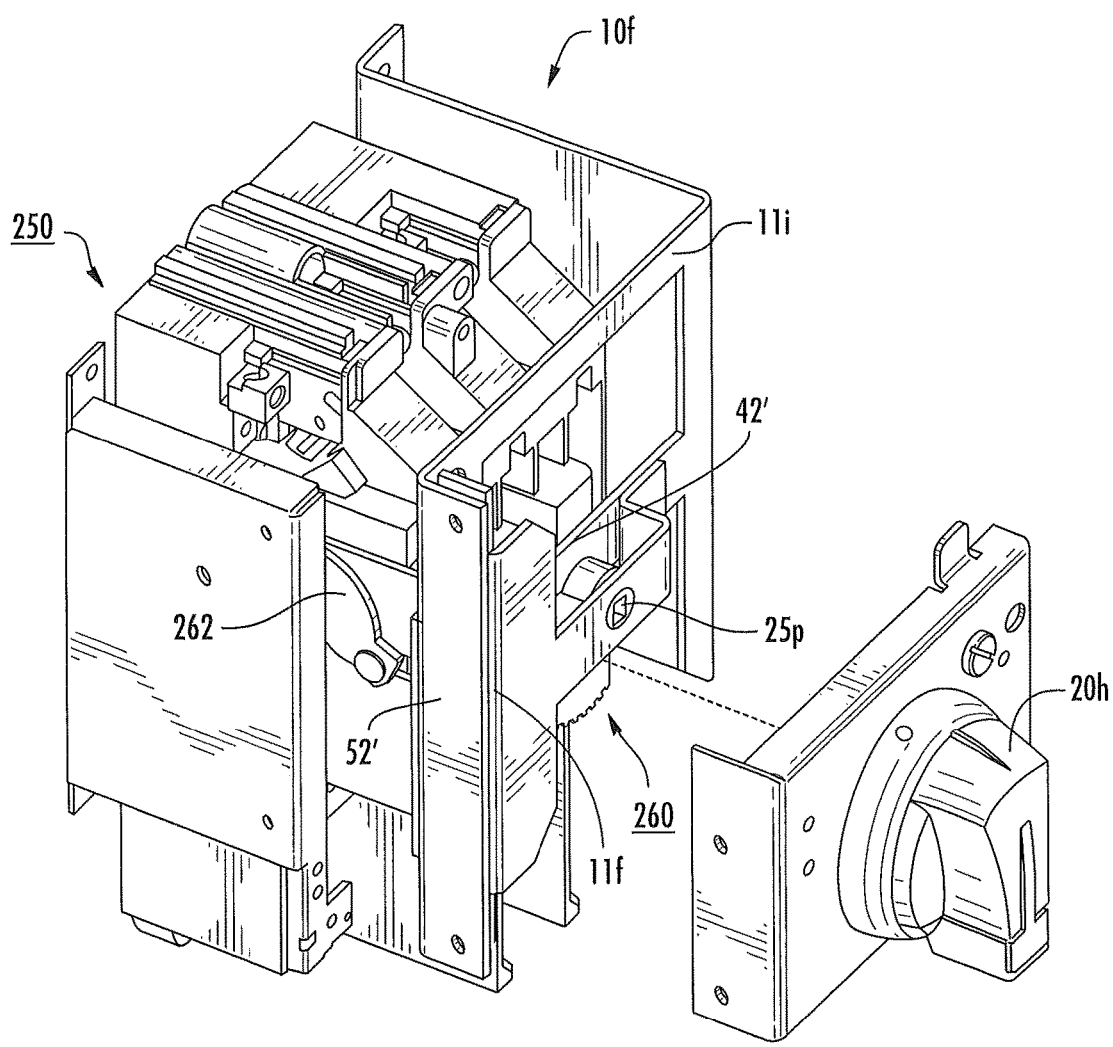
FIG. 9C is a left-side perspective, partially exploded view of the bucket assembly shown in FIG. 9A.

The rotary handle 20h can be attached to an inwardly extending shaft 25 (FIG. 3A) that is keyed to a drive gear 42, 42' (FIG. 5, FIG. 9B). The drive gears 42, 42' can have the same configuration (e.g., be the same component) or may have different dimensions or configurations. In some embodiments, the drive gear for the operator mechanism 42 as well as the drive gear 42' for the fuse mechanism 260 can have gear teeth that extends less than a full circumference of the respective gear, typically the gear teeth 42t extend for between about 9-180 degrees, more typically about 90 degrees of the circumference of the drive gear 42, 42'.

In operation, the orientation of the rotary handle 20h can provide a visual indication of the conduction status of the operator disconnect, e.g., breaker 60 (FIG. 1A) or ON/OFF switch for the fuse disconnect switch 260 (FIGS. 9A-9D).

If the handle 20h is in a generally horizontal position, i.e., with the nose, lever or thumb knob straight across the front of the circuit breaker as shown in FIG. 1A, this orientation can be the OFF position and can be visually used as an indication that the contacts of the circuit breaker are open and that current is blocked. If the handle 20h is rotated from the orientation shown in FIG. 1A, e.g., rotated 90 degrees (typically clockwise from the orientation in FIG. 1A) as illustrated by the broken line position and arrow direction in FIG. 7A, to be parallel with the long longitudinal axis of the circuit breaker and/or the handle position in FIG. 9A, then an indication is given that the circuit contacts are closed and current is being conducted. The breaker trip position can be at about 45 degrees mid-point between ON and OFF.

The handle 20h can be circular with a protruding thumb or finger segment 21 and/or a "T" shaped member or feature (e.g., an insert) 23 residing substantially inside the circular profile with the small cross-end of the T on the outer perimeter as shown in FIG. 1A or may comprise a rotating lever type as is known to those of skill in the art.

The handle can have a rectangular lever or arm and this end can be oriented to reside on the handle 20h to provide a clean visual indicator of handle position (e.g., ON and OFF) readily visible from a distance (e.g., 5-20 feet away) in a room holding the MCC 100 (FIG. 8) with the unit(s) 10.

Figure 2:
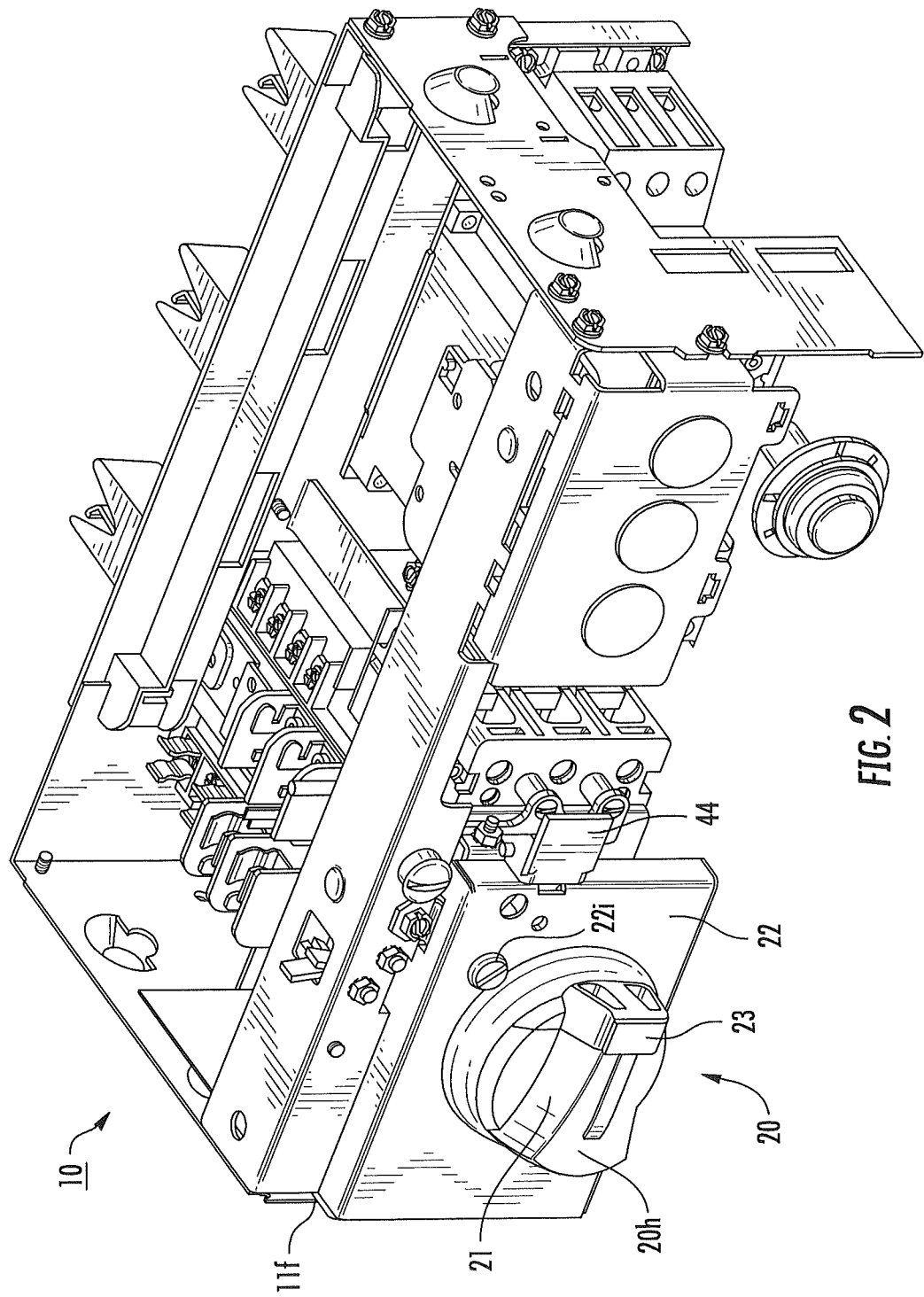
FIG. 2 is a front perspective view of the bucket assembly shown in FIG. 1A without the front cover according to embodiments of the present invention.
Figure 3A:
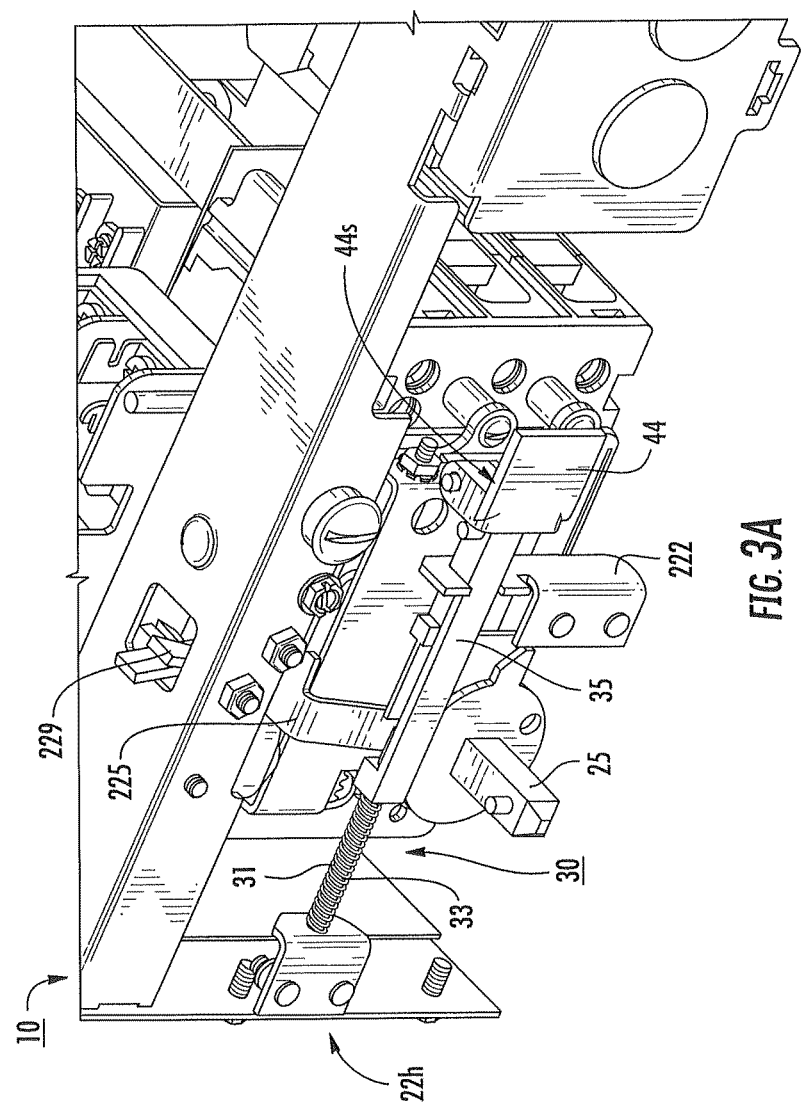
FIG. 3A is a front perspective view of the bucket assembly of FIGS. 1A and 2, but shown without the front cover and without the door that holds the rotary handle according to embodiments of the present invention.

FIG. 2 illustrates the unit 10 without the outer front cover 11c. FIGS. 3A and 3B illustrate the unit 10 with the door 22 and front cover 10c omitted. FIG. 2 illustrates that the handle mechanism 20 can be fixed the front panel door 22. The door 22 may optionally be hingeably attached to the frame 11f of the housing 11. The unit 10 can include an external door defeat interlock 22i.

Figure 11C:
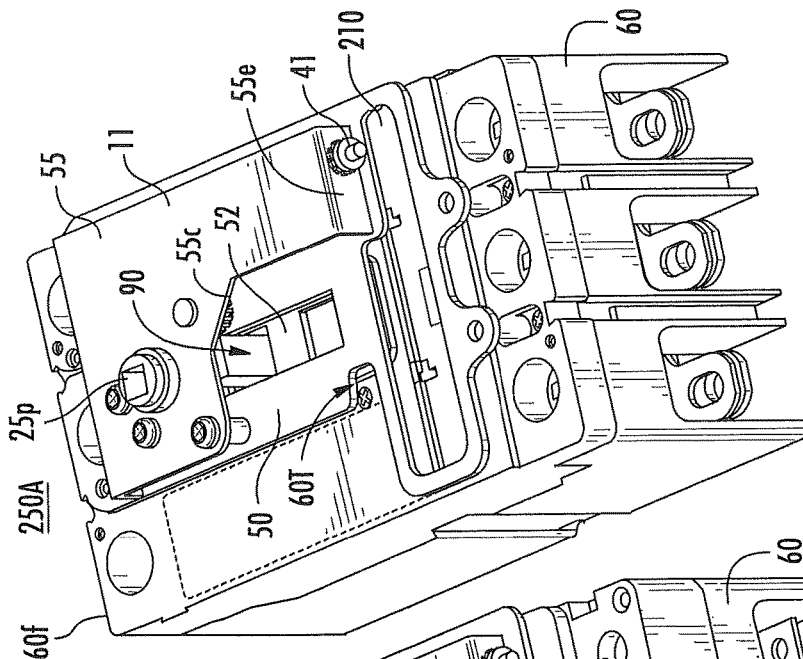
FIGS. 11A, 11B and 11C are side perspective views of small breakers of increasing frame size that each include a substantially common operator mechanism configuration (with the units oriented 90 degrees from a normal operative position) according to embodiments of the present invention.
Figure 11B:
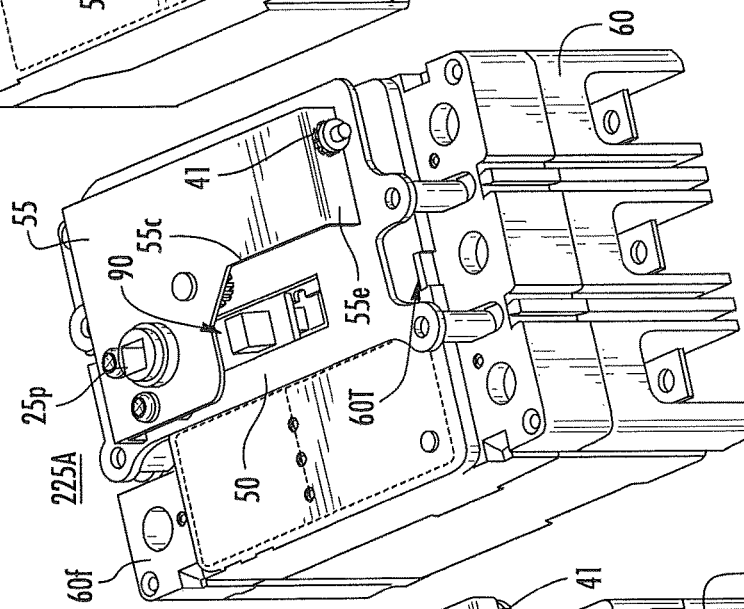
Figure 11A:
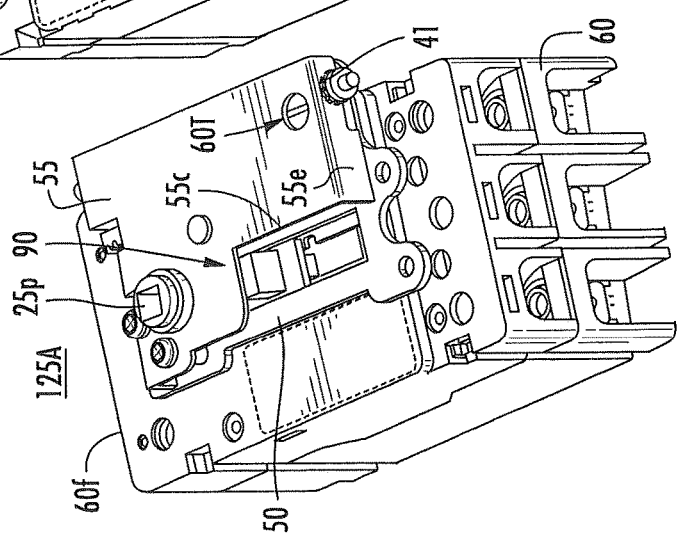

FIGS. 11A-11C, 12A and 12B illustrate that the units 10 can be circuit breaker units 10C provided in different frame sizes. The orientation of the units 10C shown in FIGS. 11A-11C is rotated 90 degrees from the typical operative position shown in FIG. 1A, for example.

As is shown in FIGS. 3A and 3B, the unit 10 can include an internal automated interlock assembly 30. As is also shown, the assembly 30 can include a bolt 31 and a biasing member 33 to urge the latch 35 into a locked configuration to extend through door bracket 222 and engage the interlock bracket 44. The latch 35 can releasably engage an inwardly facing primary surface 44s of the bracket 44 to lock the door shut. The bracket 222 can be attached to a rear primary surface of the door 22r (proximate the aperture 22a for the sliding latch 35) as shown in FIG. 1B.

FIG. 1B also illustrates that the unit 10 can include a divider pan 14 with associated apertures 14a that can cooperate with interlocks $14a_1$ and/or pin locks $14a_2$, for example.

The biasing member 33 is shown as a coil spring, but other biasing members may also be used including, for example, a leaf spring, belleville or stacked dome washers and elastic plugs or combinations of the same. The door 22 can include a hinge 22h that attaches to the frame 11f of the housing and supports the bolt 31 and biasing member 33.

The interlock assembly 30 can be integrated in the operator envelope or operator mechanism 40 and can be an automated mechanism. Thus, the interlock assembly 30 can reside inside the operator mechanism envelope 40 that comprises a laterally extending spring 33 residing over a door interlock bolt 31 configured so that the bolt can be electronically directed to automatically slidably extend to lock the door bracket 44.

In some embodiments, the circuit breaker 10 can include a handle escutcheon 227 (FIG. 3A) that communicates with the spring-loaded door lock assembly 30 that locks the door 22 shut when the circuit is energized. The door 22, latch 35 and door catch configuration 44 can be configured so as to avoid requiring manual adjustment for proper assembled alignment using the biasing member 33.

Referring to FIGS. 3A and 3B, the handle escutcheon 227 can interact with an upwardly extending arm 225 with a horizontally oriented slot 228 that slidably engages a stationary shaft 229 as a safety lock for the door.

FIGS. 3A and 3B also illustrate that the rotary handle 20h can engage an inwardly extending drive shaft 25 that extends into the unit housing through the door 22 or other housing frames 11f via a path or portal 25p.

The circuit breaker unit 10C also includes a rotary to linear translating operator mechanism 40. The operator mechanism 40 can be integrally and/or permanently mounted to the unit housing or body 11.

Figure 6:
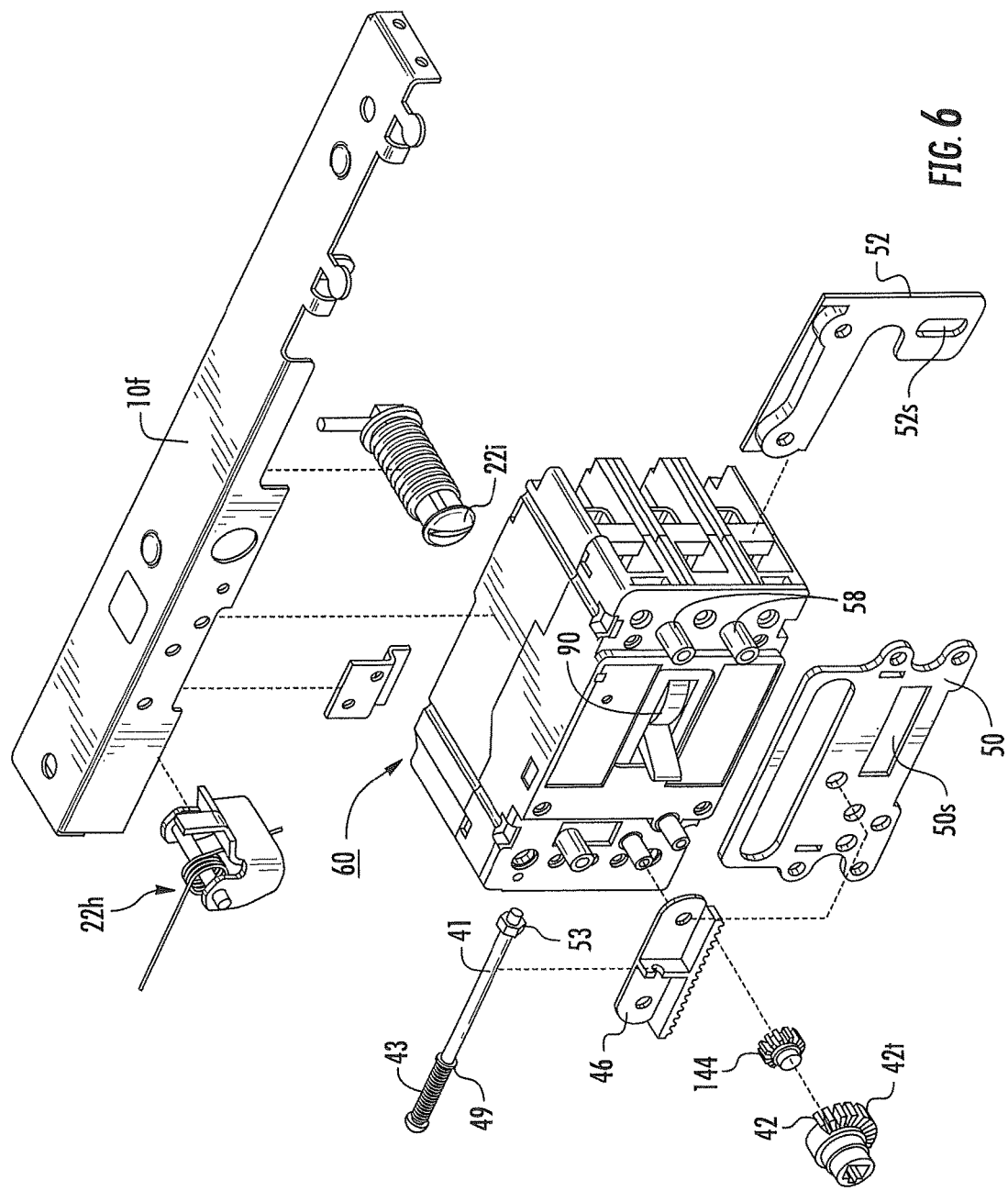
FIG. 6 is an exploded view of the rotary to linear translating operating mechanism according to embodiments of the present invention.

As shown in FIG. 6, the operator mechanism 40 can include a drive gear 42, a pinion gear 144, and an operator rack gear 46. Generally summarized, the handle 20h via shaft 25 is keyed to interface with the rotary drive gear 42. Drive gear 42 interacts mechanically with pinion gear 144. Pinion gear 144 also interacts with the linearly translationally moveable rack 46. Consequently, as the handle 20h rotates, because it is interlocked with the drive gear 42, the drive gear 42 rotates on its axis, thus rotating the pinion gear 144, which then linearly moves the rack 46. The rack 46 then moves the operator slider 52 which moves to trip lever 90 as the handle 20h moves.

Figure 4:
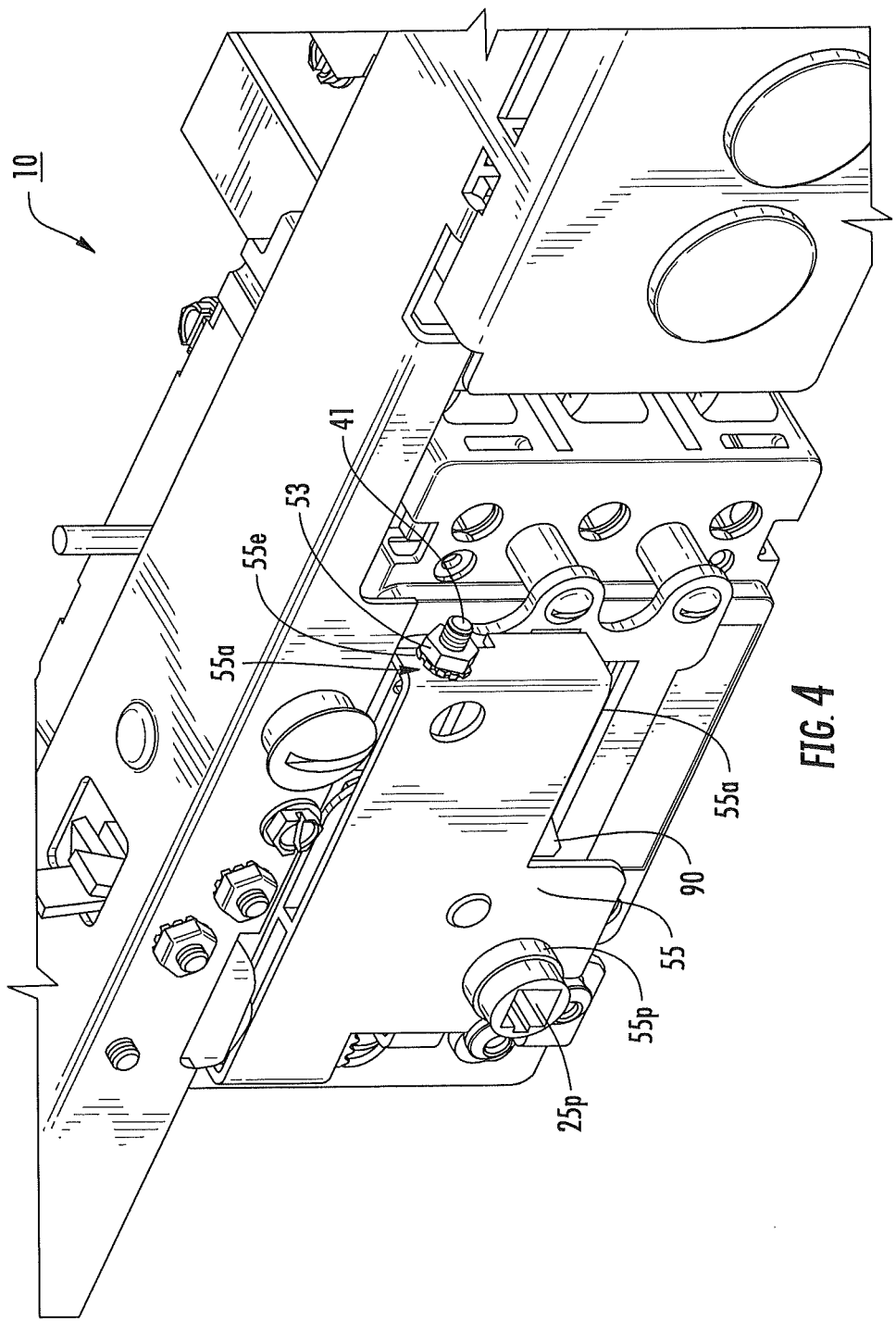
FIG. 4 is a front perspective view of the bucket assembly shown in FIG. 1A with the drive shaft and door interlock components omitted to illustrate the breaker mechanism with drive shaft portal integrally mounted to the breaker bucket assembly according to embodiments of the present invention.

Referring to FIGS. 4-6, the operator mechanism 40 can include an operator base 50 and the slider 52. The operator base 50 can be stationary and affixed to the inner housing 11h (FIG. 6). The base 50 can have a horizontally oriented elongate slot 50s that is aligned with a smaller slot 52s in the operator slider 52. The slots 50s, 52s cooperate to hold lever 90 (toggle) and when the operator slider with slot 52s moves to the right (based on rotation of the handle 20h, for example), this moves the lever 90 to the right along the path defined by slot 50s.

It is noted that the lever 90 (also known as a toggle) can move laterally as shown or the circuit breaker or fuse switch may be oriented to move vertically.

Figure 15:
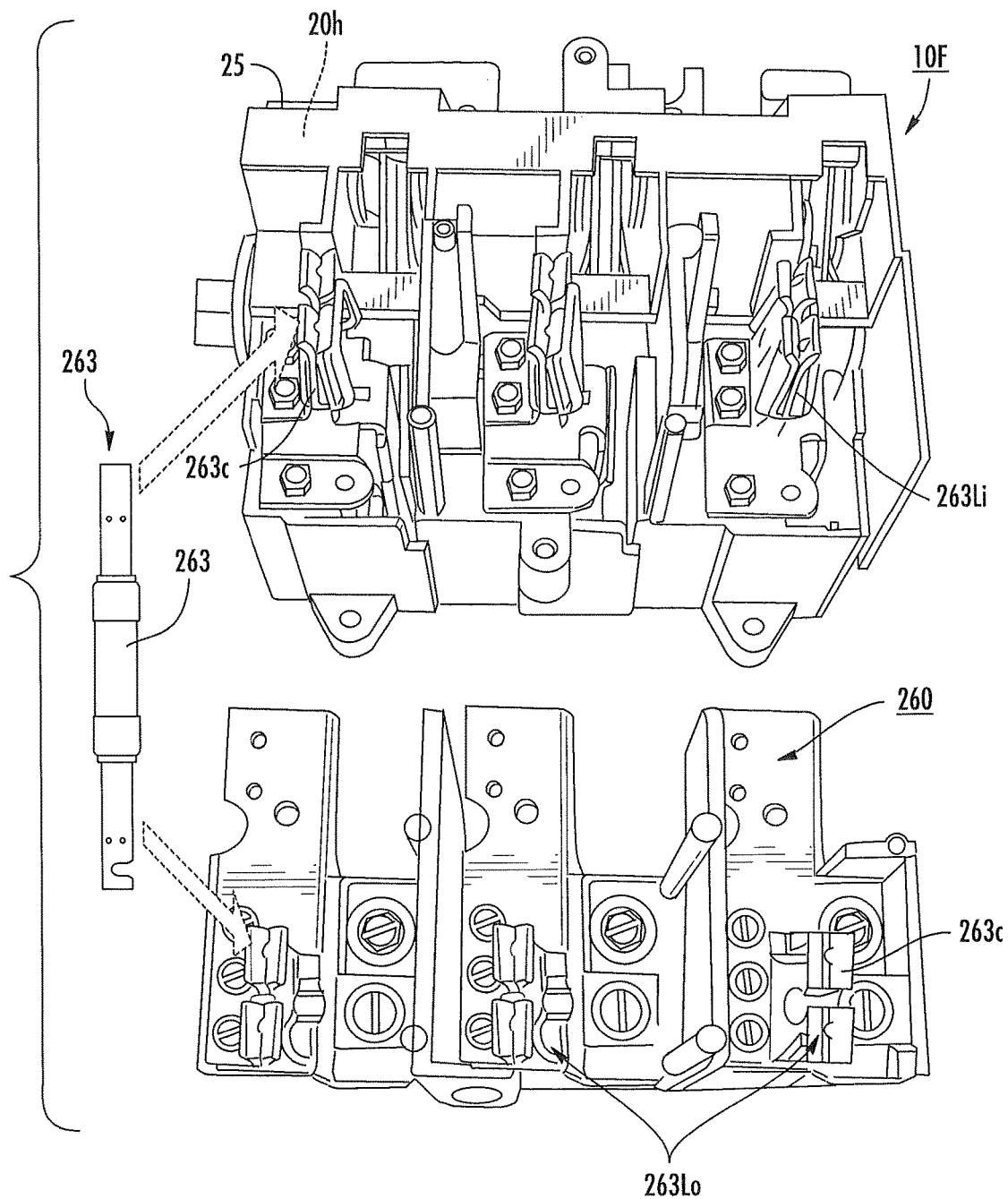
FIG. 15 is a top perspective view of a fused switch arrangement with a fuse and a load-end fuse clip connection according to embodiments of the present invention.

FIGS. 9A-9D illustrate an exemplary fuse bucket 10F with the drive gear 42' in communication with a rack gear 46 that moves up and down or orthogonal to the rack gear 46 of the operating mechanism 40 shown in FIGS. 1A-5, for example. This movement can engage and move a fuse switch lever or input up and down for ON/OFF operation (FIG. 15 illustrates an exemplary arrangement of a fuse and load end fuse clip).

For units with circuit breakers 60, the operating mechanism 40 can also include a trip assist spring 43 that is in communication with the rack gear 46 to assist the handle 20h to move to a consistent OFF position when the circuit breaker is tripped.

As shown in FIG. 5, the spring 43 is typically compressed in operative position. As also shown in FIGS. 5 and 6, the rack gear 46 can have an outwardly extending arm 47 (extending in a direction toward the door 22) with an opening 48. The opening 48 can receive a guide rod 41 that can be held in the trip assist spring 43 to provide a controlled lateral travel path for the trip assist spring 43. Where used, the arm 47 can have an open or closed end (forming a through aperture or an outward facing open ended slot) to hold the guide rod 41 and cooperate with outer member 49 to compress the spring 43 (or other biasing member). The spring 43 typically resides between the end frame of the housing and an arm 47 or other support member that can cooperate with the spring 43 to provide the desired compression.

The spring 43 can spring bias the operating mechanism 40 to a consistent trip position, independent of a breaker toggle trip position. That is, in the past, if tripped, the lever or breaker toggle 90 will move to a TRIP position with little force. Unfortunately, this may not be sufficient force to move the lever 90 to a consistent trip orientation/position.

The spring 43 can be configured to provide a suitable trip-assist force. The spring 43 can be configured with a length and and/or k-factor such that the slider 52 is biased to a center of its travel path between ON and OFF positions. The length of the spring 43 can vary depending on the type or size lever 90 and/or associated breaker 60. Although shown as one spring 43, more than one spring can be used, alone or with other cooperating members, e.g., an elastically resilient plug, belleville washers, stacked resilient dome washers and the like, to provide a desired spring force and/or biasing action. In addition, the spring 43 may be omitted in favor of one or more different resilient members to provide a suitable trip assist force.

In some embodiments, the spring 43 can have a length that is about 50% to about 100% of a length of the travel path of the operator slider 52 between ON and OFF positions.

The spring 43 can reside between a mounting member 55 and the operator base 50. The mounting member 55 can be formed integral with the base member 50 or be provided as a separate component that can attach to the operator base 50. The mounting member 55 can hold the guide rod 41 above the lever 90. The mounting member 55 can include an end portion that turns inwardly to be substantially orthogonal to a primary surface 55p of the mounting member. The end portion 55e can include a slot, channel or aperture 55a that allows the rod 41 to extend through to support the rod. However, the mounting member 50 can hold the rod inside its body and does not require the aperture 55a. The mounting member 55 can be a monolithic member with a formed end portion 55e or may include attached cooperating components.

The operator base 50 and be in communication with the rack gear 46 to can provide sufficient force to move the handle 20h to a consistent TRIP position/orientation.

The handle 20h can be detented when the operating mechanism 40 is in the spring-biased TRIP position to be in an externally visible consistent TRIP position. The ON and OFF positions can be separated by about 90 degrees.

While the circuit breaker bucket 10C is shown with the operating mechanism 40 having a guide rod 41 in the figures, it is contemplated that other configurations or components can be used to provide the desired controlled lateral path for the compression of the spring 43 and/or other biasing members and proper movement of the sliding base 52 and/or rack 46 to provide the desired trip assistance.

In operation, the breaker 60 with the spring 43 can bias/force the slider 52 to move to a position at or proximate a center of a travel length. The spring 43 can be sized and configured to move the handle 20h to a middle position, e.g., about 45 degrees.

Figure 13:
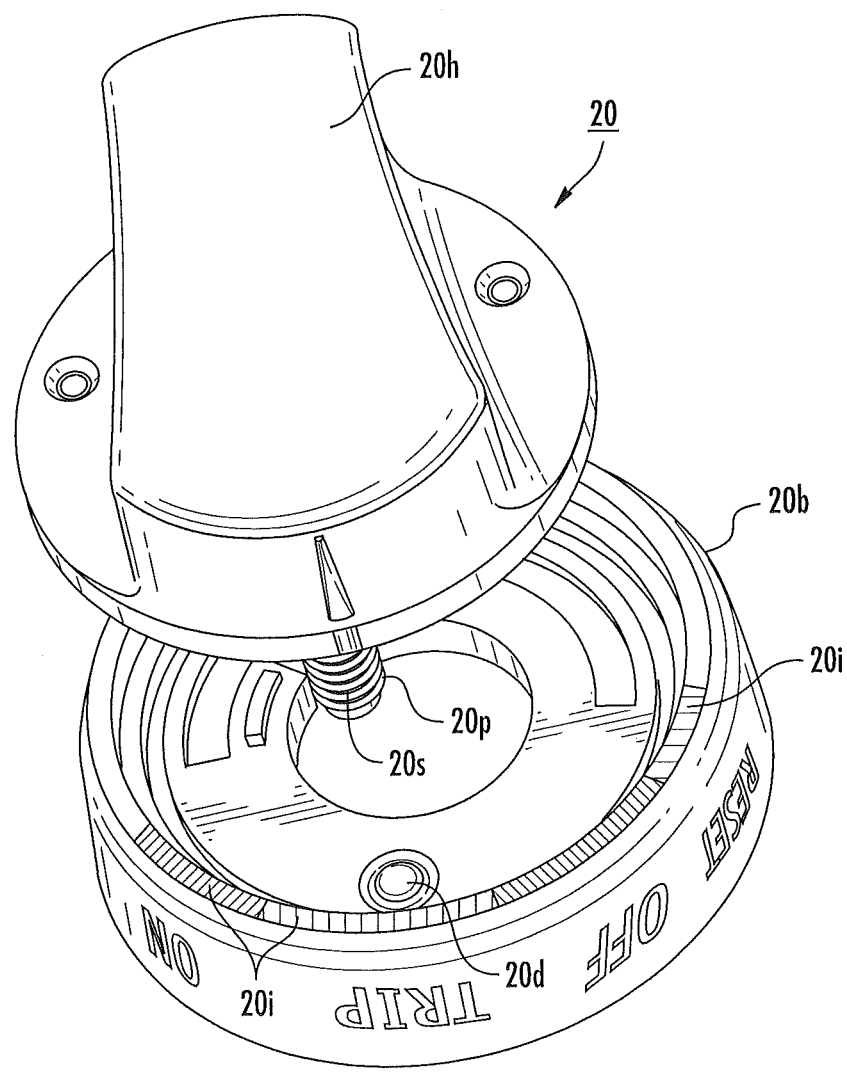
FIG. 13 is an exploded view of a handle mechanism illustrating an exemplary detent configuration according to embodiments of the present invention.

FIG. 13 illustrates the handle 20h and an underlying base 20b that slidably (rotatably) holds the external handle 20h. The base 20b can include visual indicial 20i of handle operational position, e.g., the On/OFF/TRIP/RESET position text and/or color-coded features at appropriate locations about an outer perimeter. Alternatively or additionally, the exterior cover 10c may include this visual indicia. As shown, the handle 20h can include an inwardly extending plunger 20*p* that cooperates with surface features or members on the base 20*b*. As shown, the base 20*b* can include a projecting feature or member configured as a detent 20*d* that resides in line with a trip position of the handle 20*h* between the ON and OFF positions. The plunger 20*p* can reside inside a spring 20*s* or cooperate with other biasing members to facilitate the movement. Thus, the handle 20*h* can be detented in the spring biased trip position to the trip position to provide a visually consistent handle 20*h* trip position.

The guide rod 41, where used, can have a length that is greater than the length of the trip assist spring 43 and may have a length that is about the same as a long side width of the operator base 50. In some embodiments, the trip assist spring 43 can have a length that is between about 30-80% less than a length of a guide rod 43 extending therethrough.

In some embodiments, the rear surface of the rotary handle 20*h* resides a distance "d1" (FIG. 3) that is within about 0.25 inches to about 1 inch, more typically from a distance that is about ½' to about ¾ inch, from the front surface of the operator base 50 (in a depth direction) with the drive gear 42, pinion gear 144, rack gear 46, and trip assist spring 43 therebetween.

FIGS. 4 and 5 illustrate that opposing ends of the guide rod 41 can be held by the mounting member 55 so that the guide rod 41 and spring 43 reside above the rack gear teeth 46*t*. In some particular embodiments, the guide rod 41 can be held in place using one or more attachment members 53 to inhibit or prevent lateral translation of the guide rod 41. The attachment member 53 can comprise a lock washer. In other embodiments, the attachment members 53 can have other configurations. The attachment member 53 can have threads for a threaded engagement, e.g., a threaded nut. In other embodiments, the rod 41 end portion can be configured to threadably engage a threaded insert held in the aperture 55*a*. In yet other embodiments, the rod 41 can include a radially extending aperture that resides outside the aperture 55*a* and can engage a locking pin or other suitable attachment feature/member.

The mounting member 55 can have a primary upwardly extending surface 55*s* that is substantially planar and can include a cutout or shape that provides an open space 55*o* for the toggle or lever 90 and a portal and/or path 55*p* for the drive shaft 25. FIGS. 4-6 illustrate that the member 55 can be attached to the operator base 50 and each member 50, 55 can be stationary and attached to the circuit breaker 60 via standoffs 58.

In some embodiments, the mounting member 55 resides a distance "d2" (FIG. 4) that is within about 0.1 inches to about 0.5 inches from the front surface of the operator base 50 (in a depth direction) with the drive gear 42, pinion gear 144, rack gear 46, and trip assist spring 43 therebetween, typically about 0.25 inches.

The operating mechanism 40 can include a blocking member 49 that resides about the rod 41 and that traps the spring to the left of the right half of the rod 41 and compresses at least a portion of the spring 43 as the rack gear 46 translates in one direction (e.g., toward the left).

The operating mechanism 40 can be configured so that the spring 43 has a compressed configuration when in use, e.g., when the lever is in both the OFF and ON position to be able to bias the slider 52 to a center of its travel path. Stated differently, the spring 43 is configured to have a compressed configuration irrespective of the position of the rack gear 46 and lever 90.

The blocking member 49 can be a washer, nut, sleeve or other sufficiently rigid member and/or a protrusion on the outer surface of the rod itself that provides suitable obstruction with a cooperating component or feature on the rack gear 46 so as to compress the spring 43 and provide the desired biasing force.

As shown, the blocking member 49 can contact the upper end portion 46*u* (e.g., arm 47) of the rack gear 46. The blocking member 49 and arm 47 thus cooperate to trap one end of the spring to thereby compress the spring 43.

Embodiments of the invention provide circuit breakers 10 with a rotary position of the rotary handle 20*h* positioned on a centerline of the breaker 60, in-line with a corresponding center pole.

As shown in FIG. 7B, embodiments of the invention can provide units 10 with symmetrically positioned disconnect operator handles 20*h* on an MCC allowing a panel board, mounted tandem (line to line), dual feeder breakers $60_1$, $60_2$, in a compact unit 10 with both handles 20*h* aligned (e.g., laterally spaced apart but residing at about the same height or at the same height. The breakers 601, 602 can be oriented so that respective load sides 300L are on respective left hand and right hand outer ends and the incoming or feed circuit or path 300I can be shared along a center of the unit as shown.

Figure 9D:
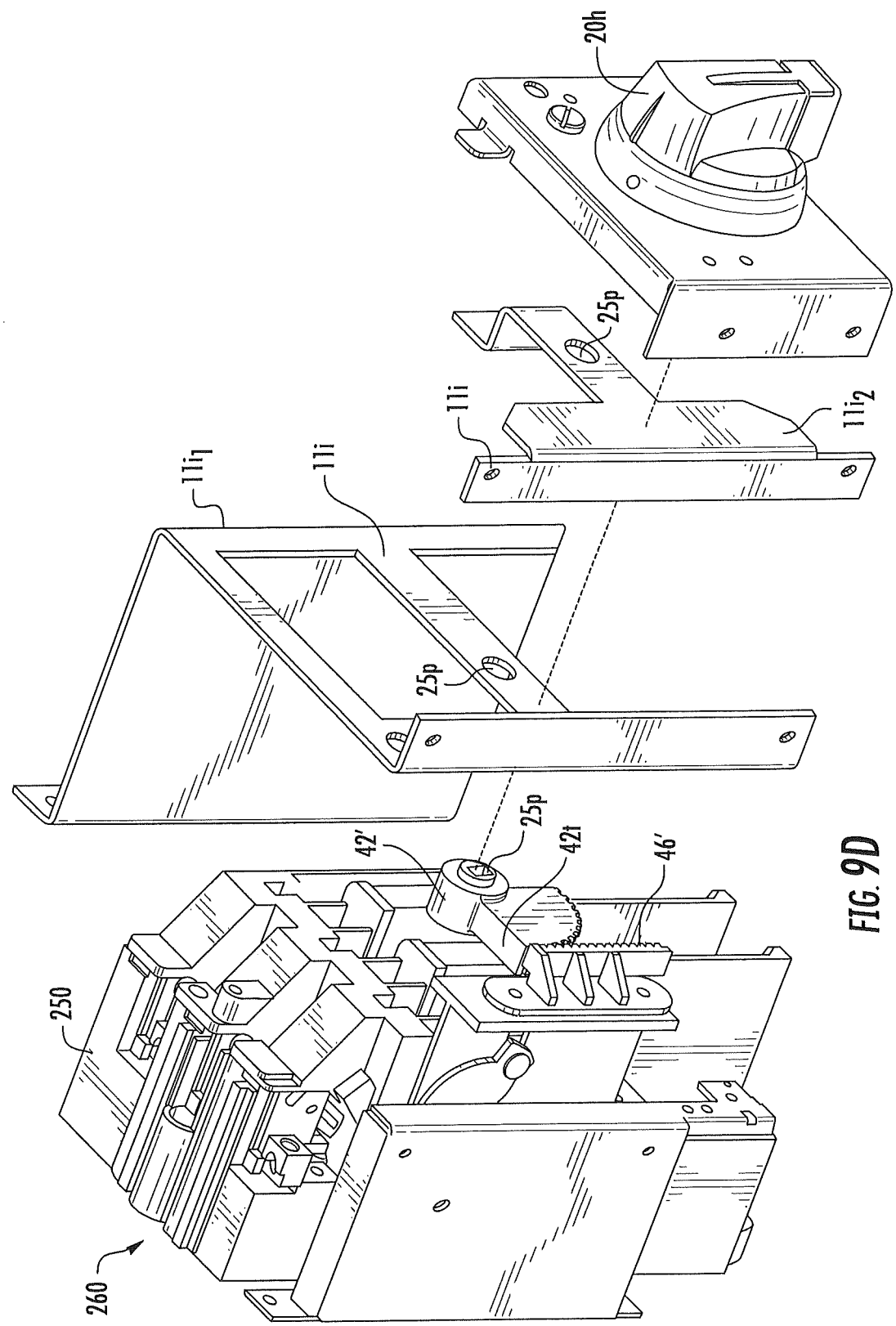
FIG. 9D is a left-side perspective, partially exploded view of the bucket assembly shown in FIG. 9A.
Figure 10A:
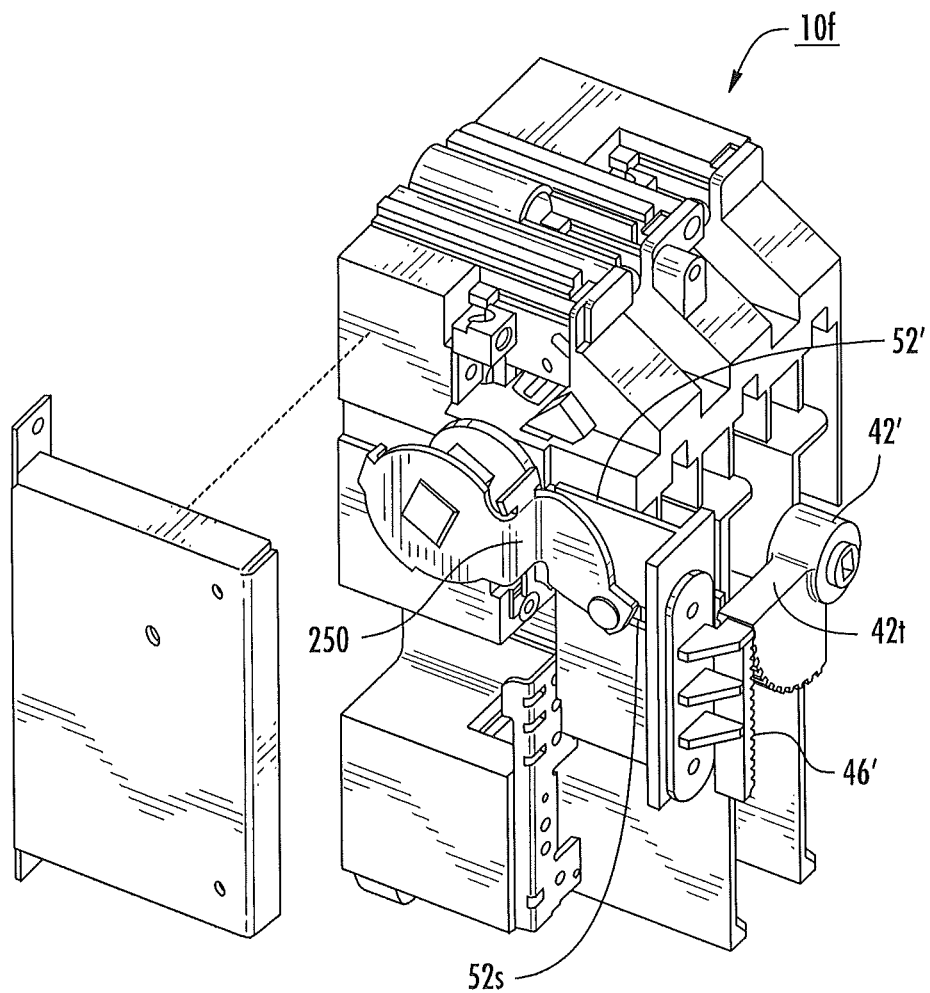
FIG. 10A is left-side, partially exploded view of the bucket assembly shown in FIG. 9D illustrating the primary drive gear apart from the rack gear and slider according to embodiments of the present invention.

FIGS. 9A-9D, 10A and 10B illustrate a bucket unit 10 which is an example of a fuse based unit 10F. The unit 10 can include a housing or unit body 11 with a housing frame 11*f* and external cover 11*c* and optional door 22. The handle 20*h* can reside over on side of the cover 11*c*, located closer to a left side of the unit (for single units at a single level). The frame 11*f* can include at least one planar laterally extending interior frame member 11*i* that can include a portal 25*p* for an inwardly extending shaft 25 that attaches to the handle 20*h* and is keyed to the drive gear 42' as discussed with respect to the embodiment shown in FIG. 1A. As shown in FIG. 9D, the interior frame member 11*i* can include cooperating first and second members $11i_1$ and $11i_2$, each with a shaft portal 25*p*.

Figure 14:
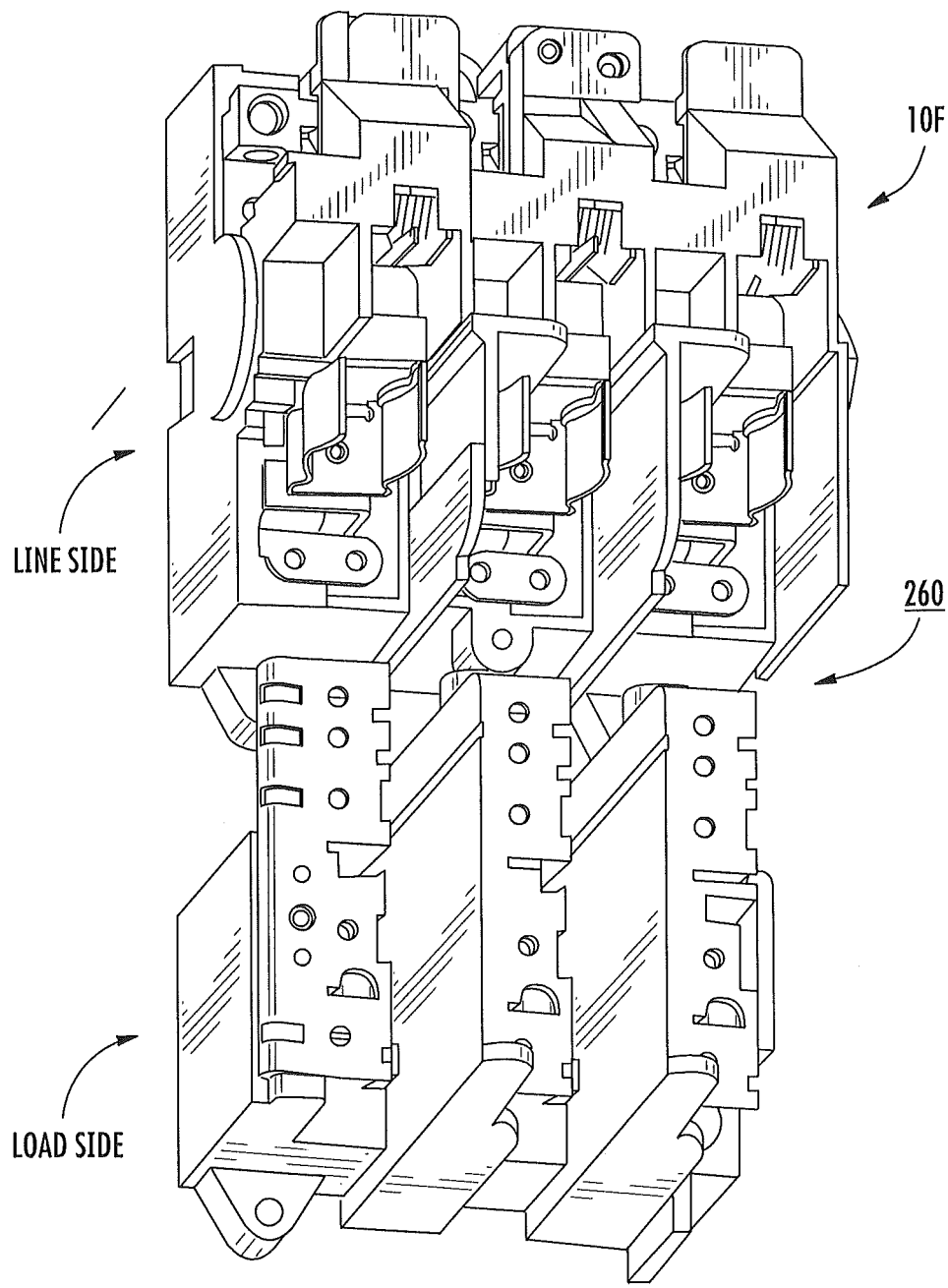
FIG. 14 is a front perspective view of an exemplary fused switch disconnect arrangement according to embodiments of the present invention.

As shown, the unit 10 includes a fuse body or fuse assembly frame 250 with a fused switch 260. FIGS. 14, 15 illustrate an exemplary fused switch unit 10F with a fuse and load-end fuse clip arrangement according to embodiments of the present invention. FIG. 15 is a front perspective view of a fused switch arrangement with a line end 263Li fuse clip connection 263*c* and a load-end 263Lo fuse clip connection 263*c* that hold respective fuses 263 according to embodiments of the present invention. The fused switch 260 can be provided as two separate components that fit into the MCC unit 10 to allow for connection to different size fuses 263. The fuses 263 can vary in length "A" and width "B" and still attach to the fuse connectors 263*c*. Exemplary fuses are FUSETRON™ 600V Class RK5 fuses (BU-SB13729) available from Cooper Bussmann Company, St. Louis, Mo. However, the design is flexible and can accommodate other fuses including those in different classes.

The unit 10 also includes a fuse disconnect assembly 140 that includes a primary drive gear 42' and a rack gear 46' that are in communication with the rotary handle 20*h*. The rack gear 46' can be attached to a slider 52' that translates to move a switch 260 in communication with a pivoting arm 262. The arm 262 includes an end portion 262*e* that extends through a slot 52*s* or opening in the slider 52'. As shown, the pivoting arm 262 also includes a mounting end portion 265 which may optionally be substantially circular. The mounting end portion 265 can include an aperture that receives an attachment member to be pivotally attached to a fuse body frame and/or housing or housing frame. The arm 262 can also include a projection member 264 (which can be a discrete member or a monolithic shaped feature and/or portion of the arm) that contacts the switch 260 to force the switch between ON and OFF positions. In the embodiment shown, the projection feature/member 264 is inclined in an upward direction as it extends a distance above the arm primary body.

The bucket unit 10F can be configured to have a visually similar appearance to the bucket unit 10C with the same handle 20h and exterior housing layout/appearance although the internal ON/OFF circuit components are different.

FIGS. 11A, 11B and 11C illustrate smaller size breakers 60 which have the same operating mechanism 40 but may include different size components of the mechanism 40. The operating mechanism 40 can be configured to work with a plurality of different breaker levers or toggles 90 of different sizes. Different components of the operator 40 and/or features of the different components of the operator 40 may be sized or configured differently to accommodate the different size or layout of members of the different size breakers 60 and associated circuit breaker frames 60f (FIGS. 11A-C, 12A, and 12B, for example). For example, the base 50 and slider 52 can have a different size for each size unit, particularly to accommodate different size levers 90 or a different position or travel path length of the lever 90.

In some embodiments, one or more of the gears 42, 144, 46 of the operator mechanism 40 can be provided in different configurations, e.g., as first and second configurations, e.g., a small and larger version to work with bucket units having frame sizes/amperages from about 125 A, 225 A, 250 A, 400 A and 600 A, for example. The small version refers to circuit breakers rated between about 125 A and about 250 A. The larger bucket units 10 can have circuit breakers rated above 250 A, including 400 A and 600 A.

FIGS. 11A-C illustrate a molded case circuit breaker configuration with the metal frame configured to allow access to the breaker trip adjustment setting and a push-to-trip button, which may be arranged differently in each frame 60f. Each type/size breaker can have a unique trip switch (e.g., lever or button) location. FIGS. 11A-C illustrate exemplary trip button access feature locations 60T for respective frames 60f.

Figure 12A:
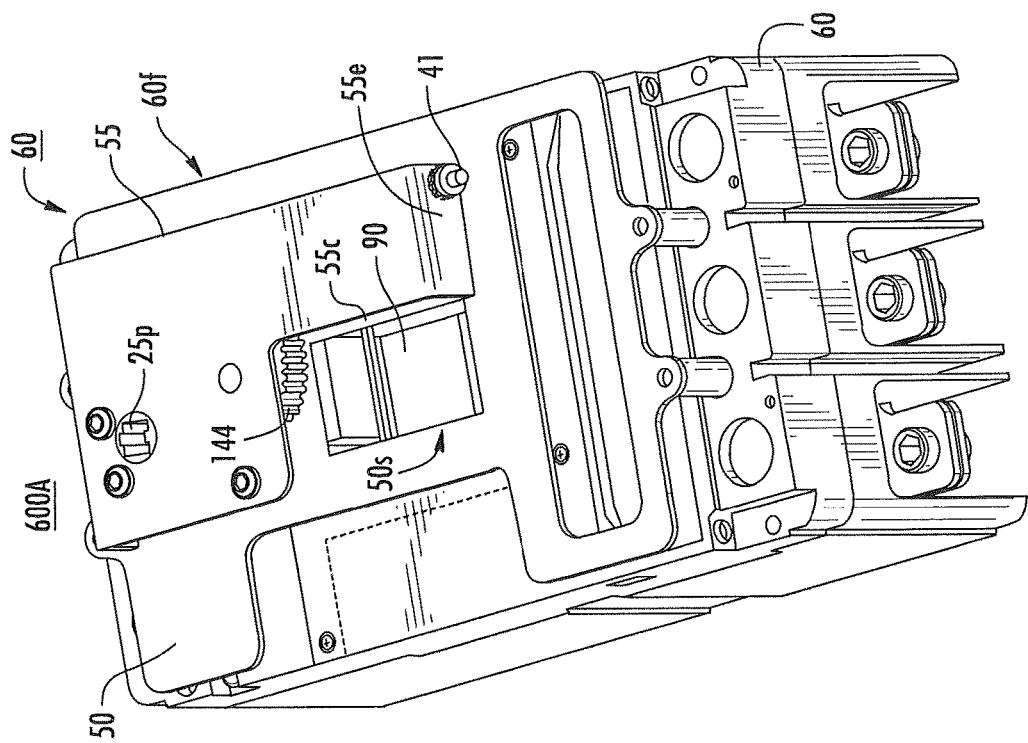
FIGS. 12A and 12B are side perspective views of large breakers of increasing frame size that each include a substantially common operator mechanism configuration (with the units oriented 90 degrees from a normal operative position) according to embodiments of the present invention.
Figure 12B:
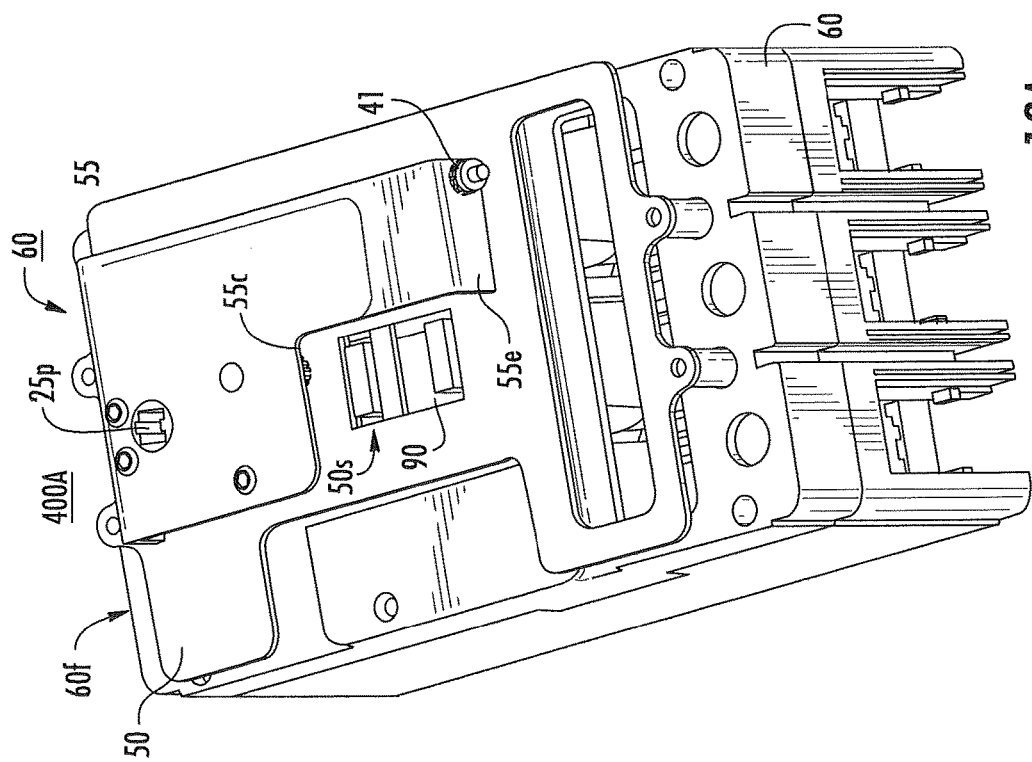
Figure 12C:
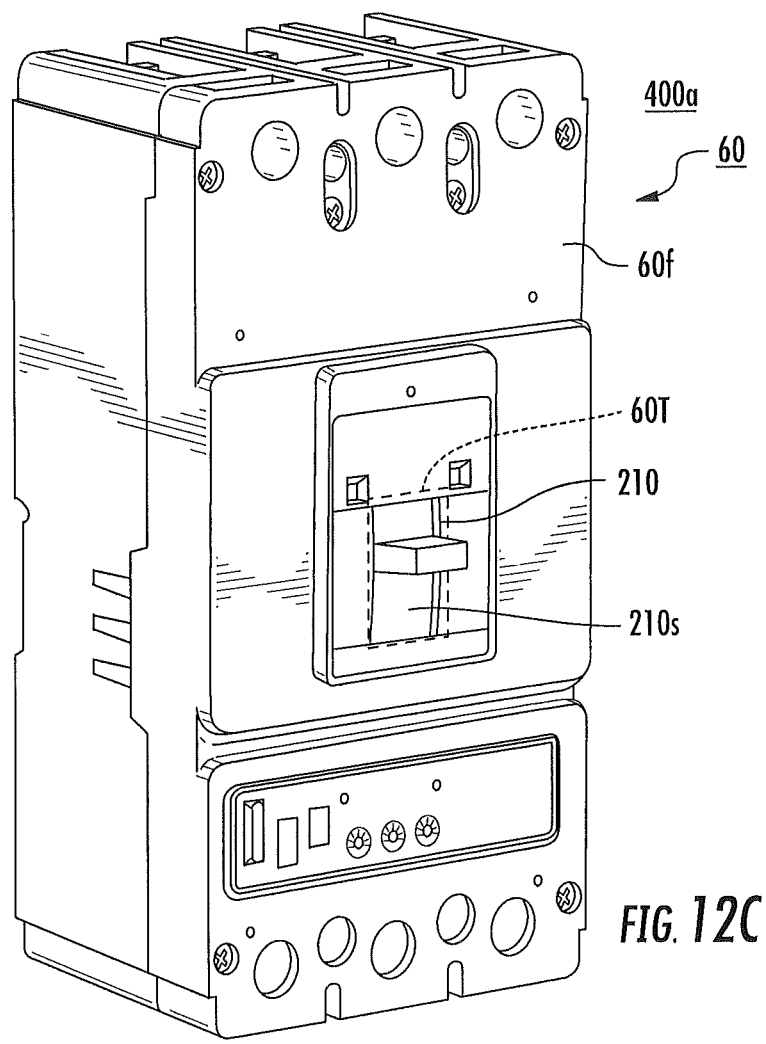
FIG. 12C is a perspective view of a circuit breaker with a trip unit module according to embodiments of the present invention.
Figure 12D:
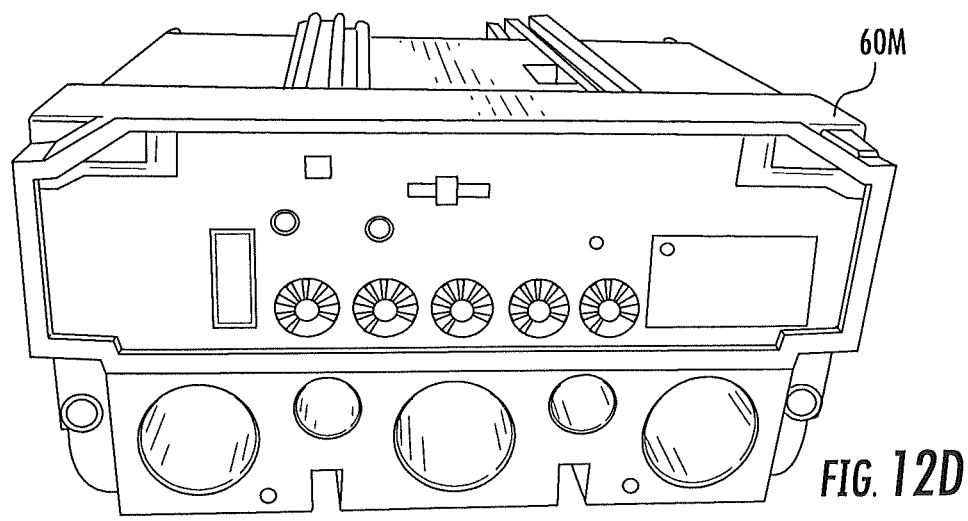
FIG. 12D is a perspective view of an example of a trip unit module according to embodiments of the present invention.

FIGS. 11C, 12A and 12B illustrate that some bucket units 10 can have a base 50 that provides the trip switch or trip button access features 60T. FIG. 12C illustrates an exemplary breaker 60 with an access window 210 for the trip switch 210s (e.g., lever or button). The access window 210 can be the same or different sizes in these units 10. The 250 A, 400 A and 600 A breakers 60 (FIGS. 11C, 12A, 12B) can be configured with interchangeable trip unit modules 60M such as shown in FIG. 12D. This trip unit module 60M shown in FIG. 12B is can be for the 600 A breaker. The access window 210 can be configured to allow access to this module. The trip unit modules 60M can have several configurations including, for example, TM (thermal-magnetic), being bimetal overload, ETU (electronic trip unit), and MCP (motor control protection) with only an instantaneous trip function.

The trip unit module 60M is typically installed prior to the operating mechanism 40 and can be used only for adjustment access.

The base 50 and cooperating slider 52 can be provided in different sizes with different length and width slots 50s to accommodate smaller and larger toggles or switches 90 associated with frames of different sizes/amperage rating. In some embodiments, when mounted in the MCC cabinet 100, the handles 20h can all substantially, if not totally, vertically align and have the same trip and/or ON/OFF positions.

Similarly, an MCC cabinet 100 can be configured so the bucket units 10 all have the same handle 20h in the same position when mounted in the MCC cabinet 100 and the units 10 can have the same ON/OFF operative positions for both fuse and circuit breaker units 10F, 10C, respectively (FIG. 8).

In some embodiments, as shown in FIGS. 11A-11C, 12A, 12B the guide rod 41, where used, can have a different length for some or all the different sizes of the circuit breakers 60.

Each unit 10 with a circuit breaker 60 can have a mounting member 55 that has a rod support end 55e that extends inwardly away from the rotary handle 20h, away from the primary surface 55s as discussed above with respect to FIGS. 3 and 4, for example. FIGS. 11A-11C, 12A, and 12B show examples of the mounting members 55 which can have different curvilinear shapes along one long side 55c to form the open space 55o to accommodate the different size/arrangements of the levers 90.

FIG. 8 illustrates an example of an MCC cabinet 100 that can support multiple units 10 of various types 10F, 10C and/or of various defined sizes, typically from between 1× to 12×. Thus, the units 10 can have a compact, visually aesthetic or "clean" appearance provided by aligned handles 20h irrespective of breaker or fuse type 10C, 10F and irrespective of frame size (breaker size). The same handle 20h can be configured to accommodate different size gears 40, sliders 52 and different size frames (different size toggles or switches 90) while providing an external similar aesthetic visual appearance with a common look of the OFF and ON positions of the handles 20h of units 10 of various types.

The units 10 can have visual indicia 20v (FIG. 9A) that indicates whether it is a fuse switch or circuit breaker type unit 10F, 10C, respectively. The visual indicia can include a label, icon, color, and the like. In some embodiments, handles 20h can have visual indicia 20v that distinguishes the type and/or size (rating) of the unit. The visual indicia 20v can be provided with a stripe or different contrast colors for a protruding lever, knob, handle or "T" or the underlying portion of the handle that is externally visible.

Embodiments of the invention provide a handle detent to assist in positioning the handle to the defined tripped configuration, typically with the handle in a vertical orientation. Embodiments of the invention can include one or more of the below claims presented in this section of the application as an alternate claim listing although not formally presented in a claim section of the application at filing of the original application.

A bucket assembly with a trip assist spring that cooperates with a rack gear and operator slider that communicate with an internal circuit breaker to move the external rotary handle to a defined consistent orientation when the circuit breaker trips.

A bucket assembly with an automated latch assembly integrated into the operator system.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, That which is claimed is:

1. A bucket assembly, comprising:
an external rotary handle having a defined ON position and OFF position associated with conduction and non-conduction;
a shaft attached to the rotary handle and extending into the bucket assembly;
an operator mechanism cooperably engaging the shaft, the operator mechanism comprising a gear assembly with a rack gear that linearly moves an operator slider;
a circuit breaker in the bucket assembly having a lever in communication with the operator slider; and
a trip assist spring that is held on a rod that is parallel to the rack gear, wherein the trip assist spring cooperates with the rack gear to move the external rotary handle to a defined consistent orientation when the circuit breaker trips, and wherein the trip assist spring and rod are parallel to a side of a primary body of the rack gear comprising gear teeth.

2. The bucket assembly of claim 1, wherein the trip assist spring and rod are both held in a fixed lateral orientation over their respective lengths, wherein the fixed lateral orientation is parallel to a long side of the side of the primary body as the side of the primary body comprising gear teeth, and wherein the rod extends through the trip assist spring and has a length that is greater than the trip assist spring, wherein the rotary handle ON and OFF positions are about 90 degrees apart, and wherein the trip assist spring is in a compressed state when the lever is in the ON and OFF positions to be able to bias the operator slider to a center of its travel path.

3. The bucket assembly of claim 1, wherein the trip assist spring is held above the rack gear in a fixed horizontal orientation on the rod, wherein the rod has a length that is greater than the trip assist spring, and wherein the trip assist spring and extends over a sub-length of the rod in a compressed configuration and applies a force to bias the operator slider to reside at a location that is at a medial position of its sliding travel path.

4. A bucket assembly, comprising:
an external rotary handle having a defined ON position and OFF position associated with conduction and non-conduction;
a shaft attached to the rotary handle and extending into the bucket assembly;
an operator mechanism cooperably engaging the shaft, the operator mechanism comprising a gear assembly with a rack gear that linearly moves an operator slider;
a circuit breaker in the bucket assembly having a lever in communication with the operator slider; and
a trip assist spring that cooperates with the rack gear to move the external rotary handle to a defined consistent orientation when the circuit breaker trips, wherein the trip assist spring is parallel to the rack gear,
wherein the rotary handle has an externally visible protruding shaped feature or member, wherein the rotary handle comprises an escutcheon that interacts with an upwardly extending arm with a horizontally oriented slot that slidably engages a stationary shaft as a safety lock for the door.

5. A bucket assembly, comprising:
a rotary handle attached to an inwardly oriented shaft;
a drive gear in communication with the shaft so that rotation of the rotary handle rotates the drive gear;
a pinion gear in communication with the drive gear;
a rack gear in communication with the pinion gear;
an operator slider in communication with the rack gear;
a stationary operator base in communication with the operator slider and attached to a circuit breaker;
a breaker lever in communication with the operator slider; and
a trip assist spring in communication with the rack gear and slider,
wherein the trip assist spring applies a force to bias the operator slider to reside at a location that is at a medial position of its sliding travel path to thereby provide a trip assist force to move the rotating handle to a consistent OFF position when the circuit breaker trips.

6. The assembly of claim 5, wherein the circuit breaker comprises a housing with a door, the rotary handle residing outside the door, and wherein the door comprises an automated electronically operated internal interlock assembly inside the operator mechanism envelope that comprises a laterally extending spring residing over a door interlock bolt, wherein the bolt slidably extends to lock a door bracket.

7. The assembly of claim 5, wherein the rack gear comprises rack gear teeth, and wherein the trip assist spring is held over an outer surface of a guide rod held above the rack gear teeth.

8. The assembly of claim 5, wherein the rack gear comprises horizontally oriented rack gear teeth, and wherein the rack gear comprises an upper segment that resides a distance above the rack gear teeth, and wherein the trip assist spring is held in a horizontal orientation over a guide rod held by the upper segment of the rack gear.

9. The assembly of claim 5, wherein the trip assist spring has an uncompressed length that is between about 50-100% of a length of the slider's sliding travel path.

10. The assembly of claim 5, wherein the trip assist spring has continuously compressed configurations when in operative position.

11. The assembly of claim 5, wherein the trip assist spring has a length that is 30-80% less than a length of a guide rod extending therethrough.

12. The assembly of claim 5, and wherein the trip assist spring is held by an outwardly extending arm of the rack gear in a horizontal orientation over a guide rod above rack gear teeth of the rack gear, and wherein at least one end portion of the guide rod is held in a fixed position.

13. The assembly of claim 5, further comprising:
a stationary mounting member that has a primary planar surface and an end portion that extends inwardly therefrom, residing in front of the operator base, closer to the rotary handle than the operator base; and
a guide rod holding the trip assist spring, the guide rod having an end portion attached to the end portion of the mounting member.

14. The assembly of claim 5, wherein the rotary handle is positioned on a centerline of the circuit breaker, substantially in-line with a corresponding center pole, to allow a load side of the breaker to reside facing an outer side wall of the housing.

15. The assembly of claim 5 in combination with a plurality of bucket assemblies held in a Motor Control Center cabinet, wherein the rotary handles of different bucket assemblies are vertically aligned irrespective of a size of a frame of the circuit breaker and have a substantially common ON/OFF position of the rotary handle.

16. The assembly of claim 15, further comprising a handle having an inwardly extending plunger rotably residing in a base having a detent to assist in positioning the rotary handle to a defined OFF position in a tripped configuration.

17. The assembly of claim 5, wherein the door interlock assembly resides within about 0.5 inches to about 1 inch envelope between a door under a front cover of and the operator base in a depth direction along with the drive gear, pinion gear, rack gear, and trip assist spring therebetween.

18. The assembly of claim 5, wherein the operator base has a horizontally extending slot, and wherein the operator slider has a rectangular slot that is smaller than the base operator slot, and wherein the breaker lever extends through both the operator slider and operator base slots, wherein the rack gear is attached to an upper portion of the operator slider, and wherein the trip assist spring is in communication with an upper portion of the rack gear.

19. A bucket assembly, comprising:
 a rotary handle attached to an inwardly oriented shaft;
 a gear assembly attached to the shaft configured to translate rotational input to linear input;
 an operator slider in communication with the gear assembly;
 a breaker lever in communication with the operator slider; and
 a trip assist spring held by a laterally extending guide rod in communication with the gear assembly, wherein the guide rod is behind and perpendicular to the inwardly oriented shaft, and
 wherein, during a trip event, the trip assist spring forces the rotary handle to a consistent trip position.

20. A motor control center (MCC) cabinet with bucket units having external rotary handles, wherein one or more bucket units are configured so that the rotary handle communicates with a fused disconnect switch and one or more bucket units are configured so that the rotary handles communicate with an operator mechanism for a circuit breaker disconnect, wherein all the rotary handles have the same configuration and the same ON/OFF rotary positions, wherein the bucket units include different breaker fused disconnect switch sizes with different size frames while providing a common external visual appearance with aligned rotary handles in the same ON and OFF rotary positions, and
 wherein the fused disconnect switch and the operator mechanism of the one or more bucket units each comprise a separate cooperating drive gear, rack gear and slider, and wherein the operator mechanism further comprises a laterally extending spring that is parallel to the rack gear and that bias' the slider to a medial position of a sliding travel path.

21. A motor control center (MCC) cabinet with bucket units having external rotary handles, wherein one or more bucket units are configured so that the rotary handle communicates with a fused disconnect switch and one or more bucket units are configured so that the rotary handles communicate with an operator mechanism for a circuit breaker disconnect, and wherein all the rotary handles have the same configuration and the same ON/OFF rotary positions, and wherein the bucket units include different breaker fused disconnect switch sizes with different size frames while providing a common external visual appearance with aligned rotary handles in the same ON and OFF rotary positions,
 wherein the bucket units with the fused disconnect switch and the bucket units with the operator mechanism each comprise a drive gear, a rack gear and a slider, wherein the drive gear, rack gear and sliders have different sizes and cooperate with respective levers, and wherein the bucket unit with the fused disconnect switch comprises a pivoting arm that has a lower end portion that extends into a slot or aperture of the slider and a switch contact member or feature that engages the fused disconnect switch.

22. The MCC cabinet of claim 20, wherein all bucket units with a single breaker and fused disconnect switch have rotary handles that are aligned along a left hand side of the MCC.

23. A motor control center (MCC) cabinet with bucket units having external rotary handles, wherein one or more bucket units are configured so that the rotary handle communicates with a fused disconnect switch and one or more bucket units are configured so that the rotary handles communicate with an operator mechanism for a circuit breaker disconnect, wherein all the rotary handles have the same configuration and the same ON/OFF rotary positions, wherein the bucket units include different breaker fused disconnect switch sizes with different size frames while providing a common external visual appearance with aligned rotary handles in the same ON and OFF rotary positions, and
 wherein the rotary handles comprise an escutcheon that interacts with an upwardly extending arm with a horizontally oriented slot that slidably engages a stationary shaft as a safety lock for the door.

24. A motor control center (MCC) cabinet with bucket units having external rotary handles, wherein one or more bucket units are configured so that the rotary handle communicates with a fused disconnect switch and one or more bucket units are configured so that the rotary handles communicate with an operator mechanism for a circuit breaker disconnect, wherein all the rotary handles have the same configuration and the same ON/OFF rotary positions, wherein the bucket units include different breaker fused disconnect switch sizes with different size frames while providing a common external visual appearance with aligned rotary handles in the same ON and OFF rotary positions, and
 wherein the rotary handles comprise an inwardly extending plunger with a spring held thereabout to facilitate movement of the rotary handles to a consistent handle TRIP position.

\* \* \* \* \*